US012000332B2

(12) United States Patent
Jackson et al.

(10) Patent No.: US 12,000,332 B2
(45) Date of Patent: Jun. 4, 2024

(54) SYSTEM AND METHOD FOR OPPOSED PISTON BARREL ENGINE

(71) Applicants: Matthew Jackson, Washington, UT (US); Dimitrios Dardalis, Austin, TX (US)

(72) Inventors: Matthew Jackson, Washington, UT (US); Dimitrios Dardalis, Austin, TX (US)

( * ) Notice: Subject to any disclaimer, the term of this patent is extended or adjusted under 35 U.S.C. 154(b) by 0 days.

(21) Appl. No.: 18/081,192

(22) Filed: Dec. 14, 2022

(65) Prior Publication Data

US 2023/0243297 A1 Aug. 3, 2023

Related U.S. Application Data

(60) Provisional application No. 63/304,692, filed on Jan. 30, 2022.

(51) Int. Cl.

| | |
|---|---|
| ***F02B 75/32*** | (2006.01) |
| ***F01L 1/04*** | (2006.01) |
| ***F01M 9/06*** | (2006.01) |
| ***F01P 3/12*** | (2006.01) |
| ***F02B 37/00*** | (2006.01) |
| ***F02B 75/00*** | (2006.01) |

(Continued)

(52) U.S. Cl.

CPC ................ *F02B 75/32* (2013.01); *F01L 1/04* (2013.01); *F01M 9/06* (2013.01); *F01P 3/12* (2013.01); *F02B 37/00* (2013.01); *F02B 75/005* (2013.01); *F02B 75/02* (2013.01); *F02B 75/18* (2013.01); *F02B 75/24* (2013.01); *F02B 75/26* (2013.01); *F02B 75/282* (2013.01); *F02D 17/02* (2013.01); *F02F 3/28* (2013.01); *F02B 2075/025* (2013.01); *F02B 2075/027* (2013.01); *F02B 2075/1836* (2013.01)

(58) Field of Classification Search

CPC ........ F02B 37/00; F02B 75/005; F02B 75/02; F02B 2075/025; F02B 75/04; F02B 75/32; F02B 75/18; F02B 75/24; F02B 75/26; F02B 75/28; F02B 75/282; F01L 1/04; F01M 1/06; F01M 9/06; F01M 9/10; F01M 9/105; F01P 3/12; F02D 17/02; F02F 3/28; F01B 3/02; F01B 3/04; F01B 3/045; F01B 7/02

See application file for complete search history.

(56) References Cited

U.S. PATENT DOCUMENTS

| | | | |
|---|---|---|---|
| 2,080,846 | A | 5/1937 | Alfaro |
| 2,243,817 | A | 5/1941 | Herrmann |

(Continued)

FOREIGN PATENT DOCUMENTS

| | | | |
|---|---|---|---|
| EP | 3066312 | B1 | 2/2019 |
| LU | 82321 | A1 | 7/1980 |

*Primary Examiner* — Loren C Edwards

(74) *Attorney, Agent, or Firm* — Bold IP PLLC; Christopher Mayle

(57) ABSTRACT

This invention has two main embodiments. An opposed piston 2-stroke axial engine and a 4-stroke axial engine. The opposed piston two stroke also offers an option of a novel cylinder deactivation design. Both, two stroke and four stroke engines share novel systems for coupling piston reciprocation to shaft rotation, piston and piston ring lubricant distribution, and provision for reacting out piston side load with minimum mechanical friction.

16 Claims, 31 Drawing Sheets

(51) Int. Cl.

| | |
|---|---|
| ***F02B 75/02*** | (2006.01) |
| ***F02B 75/18*** | (2006.01) |
| ***F02B 75/24*** | (2006.01) |
| ***F02B 75/26*** | (2006.01) |
| ***F02B 75/28*** | (2006.01) |
| ***F02D 17/02*** | (2006.01) |
| ***F02F 3/28*** | (2006.01) |

(56) References Cited

U.S. PATENT DOCUMENTS

| | | | | | |
|---|---|---|---|---|---|
| 2,243,818 | A | | 5/1941 | Herrmann | |
| 2,243,819 | A | | 5/1941 | Herrmann | |
| 2,243,820 | A | | 5/1941 | Herrmann | |
| 2,243,821 | A | | 5/1941 | Herrmann | |
| 2,243,822 | A | | 5/1941 | Herrmann | |
| 4,869,212 | A | * | 9/1989 | Sverdlin | F01B 1/12 123/56.6 |
| 5,031,581 | A | * | 7/1991 | Powell | F01B 3/045 123/56.9 |
| 6,779,494 | B1 | | 8/2004 | Aswani | |
| 2015/0114148 | A1 | * | 4/2015 | Van Den Brink | F16H 53/06 74/56 |

* cited by examiner

SYSTEM AND METHOD FOR OPPOSED PISTON BARREL ENGINE

CROSS REFERENCE TO RELATED APPLICATIONS

This application claims priority to U.S. Provisional Patent No. 63/304,692 filed on Jan. 30, 2022, which is incorporated in its entirety.

FIELD OF DISCLOSURE

This disclosure is in the field of barrel or axial piston engines (for the piston side load claims, there is no reason to restrict this to opposed pistons). Barrel engine is defined as an engine where the cylinder axis is parallel to the main shaft axis. If the engine has one or more cylinders, the cylinders' axis surround the main shaft axis and generally have identical radial distance from the main shaft axis. Generally, the distance among individual cylinder axis is identical. The overall shape of the engine resembles a barrel, with the main engine shaft axis being the axis of the barrel, hence the name "barrel engine".

BACKGROUND

The main difference of a barrel/axial engine over a conventional engine is that the crankshaft has been replaced by a cam and roller follower system. The one or more cylinders are parallel to the main shaft rather than perpendicular to the crankshaft. There are many possible architectures of axial engines, but in this invention we cover two types. FIG. 1 shows an opposed piston two stroke axial engine, where at least one cylinder contains two pistons which reciprocate against each other, forming a combustion chamber between them. In the case of FIG. 1, two cylinders and four pistons are visible, but the engine is actually a four cylinder and eight piston engine. The piston axial location as a function of main shaft location is defined by cams at either end of the engine, and the roller followers ensure that the pistons follow their proper axial location dictated by the cams. FIG. 2 shows another option of an axial engine, in this case a four stroke engine with at least one cylinder. In FIG. 2, two cylinders are visible, but this is actually a four cylinder engine. There is no specific limit to the number of cylinders, however. One of the benefits of the barrel engine is packaging. The engine takes less space. Also, certain applications are particularly benefitted by the packaging which resembles an electric motor.

Opposed piston two stroke engines have certain advantages over conventional four stroke or two stroke engines. They do not need a cylinder head, which reduces complexity. Also, the lack of a cylinder head generates a combustion chamber geometry where the combustion chamber of two opposed pistons is equivalent to two chambers of a similar conventional engine but without the substantial cylinder head surface area that absorbs significant combustion heat prior to the expansion. This generates an inherent thermal efficiency advantage for the opposed piston configuration. The disadvantage of the opposed piston configuration, however, is that the cost of the cylinder head is traded by two crankshafts and the heavy gear train which is necessary to couple them. The cost of the additional crankshaft and gear train offsets the cost of the missing cylinder head, and therefore the cost of the engine ends up higher than conventional single-crankshaft engines. Also, the overall shape and dimensions of the engine is such that the installation can be difficult for certain applications. The engine is particularly large in the direction of the cylinder axis and is also narrow in the dimension normal to the cylinder axis and to the main shaft axis. The maximum dimension of the engine in the cylinder axis direction, in particular, is determined by the sum of the two piston strokes, plus the connecting for lengths of each piston, namely the intake piston and the exhaust piston. It needs to be noted that the connecting rod lengths are at least 50% longer than the piston stroke for most engines, so they are a considerable contribution to the overall size of the engine.

There is a number of prior patents that at first glance appear similar to the disclosed invention. These are briefly listed below. The differences that make this disclosure unique will be analyzed as the innovative features are described. However, brief descriptions of the patents will be given in this section.

In EP3066312B1, Juan describes a four cylinder opposed piston axial engine. The main feature of this patent is the fact that the timing between the intake and exhaust cam can be altered while the engine is in operation.

In U.S. Pat. No. 2,080,846 and several other patents from about the same time period, Alfaro describes a four-cylinder opposed piston axial engine. This patent seems to be the very first disclosure of such an engine in the literature. The similarities and differences to this disclosure will be expanded in the following sections.

LU82321A1 Axial engine similar to our four stroke with cylinder deactivation. In this document, design features that allow cylinder deactivation are also presented Lenert, in LU82321A1, is also describing an axial engine, which can be a two stroke or a four stroke. The cams that couple the piston motion to the main shaft rotation are internal grooves. In this patent, very little information is given about critical details of the engine design, such as the ones presented in this document.

A series of patents ranging from U.S. Pat. No. 2,224,817 to 2,224,822 describes a four stroke axial engine that shares a lot of similarities to the two four stroke axial engine embodiments described in this document. This series of patents gives a lot of design details. There are of course significant differences in these details, which are analyzed in this document.

SUMMARY

The engine configuration shown in FIG. 1 retains all the advantages of the opposed piston configuration, but has the following main advantages. As discussed in the prior paragraph, the shape of the engine is substantially different, which makes the overall packaging of certain machines more optimal. Specifically, while the maximum dimension of the proposed engine is still along the axis of the cylinders, this maximum length does not include connecting rods. This reduces the maximum dimension by at least 25%.

Furthermore, in the conventional opposed piston engines, the coupling of the intake and exhaust crankshaft requires heavy gears which need to be strong enough to withstand the torsional vibrations which are typical in piston engines, especially in diesels. In this axial engine configuration, the coupling is done by the main shaft, and as a result a large amount of expensive hardware is eliminated. Furthermore, the axial load due to combustion pressure is applied by each piston on its corresponding cam. These loads are of course equal, and completely cancel each other, therefore there is no need for large thrust bearing for the main shaft. Due to a small phase shift of the intake and exhaust pistons, however, the inertia loads are not perfectly identical, therefore some thrust bearing provision for the main shaft is needed. Furthermore, because the piston motion is not limited by the kinematics of the slider crank mechanism, the relationship of the piston location versus shaft angular position can be arbitrarily chosen. For optimum scavenging, the piston needs to stay longer in positions closer to the outer dead center. This of course means that the slope (inclination) of the cam in certain areas (namely, in proximity to the inner dead center) needs to be relatively steep. This feature generates a high piston side load. There are provisions in the preferred embodiment to react out most of this piston side load via anti-friction bearings with very low frictional losses.

An additional feature of the preferred embodiment is cylinder deactivation. The four-cylinder engine shown in FIG. 1 is equipped in two of its opposite cylinders with a cylinder deactivation system. Electronically actuated valves on the intake port shut off the supply of scavenge air in these two cylinders, when the engine load requirements are low. Similar valves are installed in the exhaust, to prevent gas from entering the cylinder when the pistons move apart from each other. In a few cycles, most of the air in the deactivated cylinders will escape through the piston rings and the compression in the deactivated cylinders will be very low, minimizing the friction losses from these cylinders. This way, the engine fuel consumption for these low load conditions is maximized.

General advantages of the four stroke configuration. Compactness, simplicity by four valve per cylinder four stroke standards.

FIG. 2 shows a cross section of the four cylinder four stroke axial engine along a plane intersecting the main axis of the engine as well as the axis of two of the four cylinders. Because this is a four valve per cylinder engine, the valves are offset from the cylinder axis and therefore the valves are not visible in this cross section plane. FIG. 3 shows a cross section from a plane parallel to the one of FIG. 2, but offset by a small amount so that one of the intake and one of the exhaust valves per cylinder are shown. The obvious benefits by simply viewing FIGS. 2 and 3 are compactness and unique cylindrical shape that will make the engine ideal in terms of packaging. Typical four stroke engines require a separate shaft (sometimes two) that rotate(s) at half the engine speed in order to control the valves, typically called camshafts. As it will be obvious further into this document, this proposed engine does not need a separate shaft, the valve actuation is accomplished by components that are bolted on and rotate together with the main shaft. This is possible because the cam that controls the piston motion can have twice as many piston reciprocations built into it compared to the number of cam lobes of the cam wheels that operate the valves. In the engine of FIGS. 2 and 3, there are two piston reciprocations per rotation, and one valve activation cycle. In other words, one complete revolution of the main shaft completes the thermodynamic cycle of the four stroke engine, while the conventional piston engine would require two complete crankshaft revolutions for the same cycle. However, there can be more cycles per main shaft revolution by multiplying the cam lobes on the piston cam and the cam wheels. This of course increases the slope (inclination) on the piston cam. This increased cam slope also increases the piston side load, but the side load reaction provisions of the two stroke opposed piston axial engine are also shared with this embodiment, allowing a reduction to the friction caused by the piston side load.

There are two versions of the four stroke axial engine proposed in this document. The relative advantages and disadvantages of each version are discussed in the section where the details of the four stroke version are described. One of these is shown in FIGS. 2 and 3 have a rocker system to activate the exhaust valves. This will be clearer further into the document. FIG. 4 shows a cross section of the other version of the four stroke axial engine, sectioned in a plane similar to the one of FIG. 2. This version has a direct actuation of the exhaust valves by the cam wheel.

In any type of complicated machine design such as an internal combustion engine, the details are just as critical in its success as the overall architecture. In this paragraph, the critical need of the piston side load is introduced. When the aggressive piston cam profiles discussed above for both the two stroke and four stroke (where the cam slope becomes steep) are used, the side reaction on the piston assembly is increased. This creates a high piston side load, which can generate high friction force if not reacted out properly. In the two stroke case, the cam for the exhaust piston is designed such that the piston stays very briefly in the inner dead center region but its movement in the outer dead center region is relatively slow. That allows for far more effective scavenging. However, the resulting relatively steep inclination of the cam around the inner dead center area generates large piston side loads (to an unfamiliar person, the cam inclination near inner and outer dead center appears small, but this is the area where the highest axial loads are generated, and despite the lower inclination, this area within 20 degrees from the dead centers is where the piston side load peaks). When conventional crankshaft opposed two stroke engines try to approach a profile similar to the one proposed here, a very short connecting rod is needed, which also causes increases in the side loads. In order to deal with that, the designers often have to resort to double-crank and double connecting rod configurations (which requires three crankshafts total with associated coupling gearing), resulting in even more complexity and shaft friction. The piston side-load provision described in this invention allows even more aggressive profiles without the need for substantial complexity. The provision of reacting out the side loads with roller element bearings with very low friction makes this profile possible.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
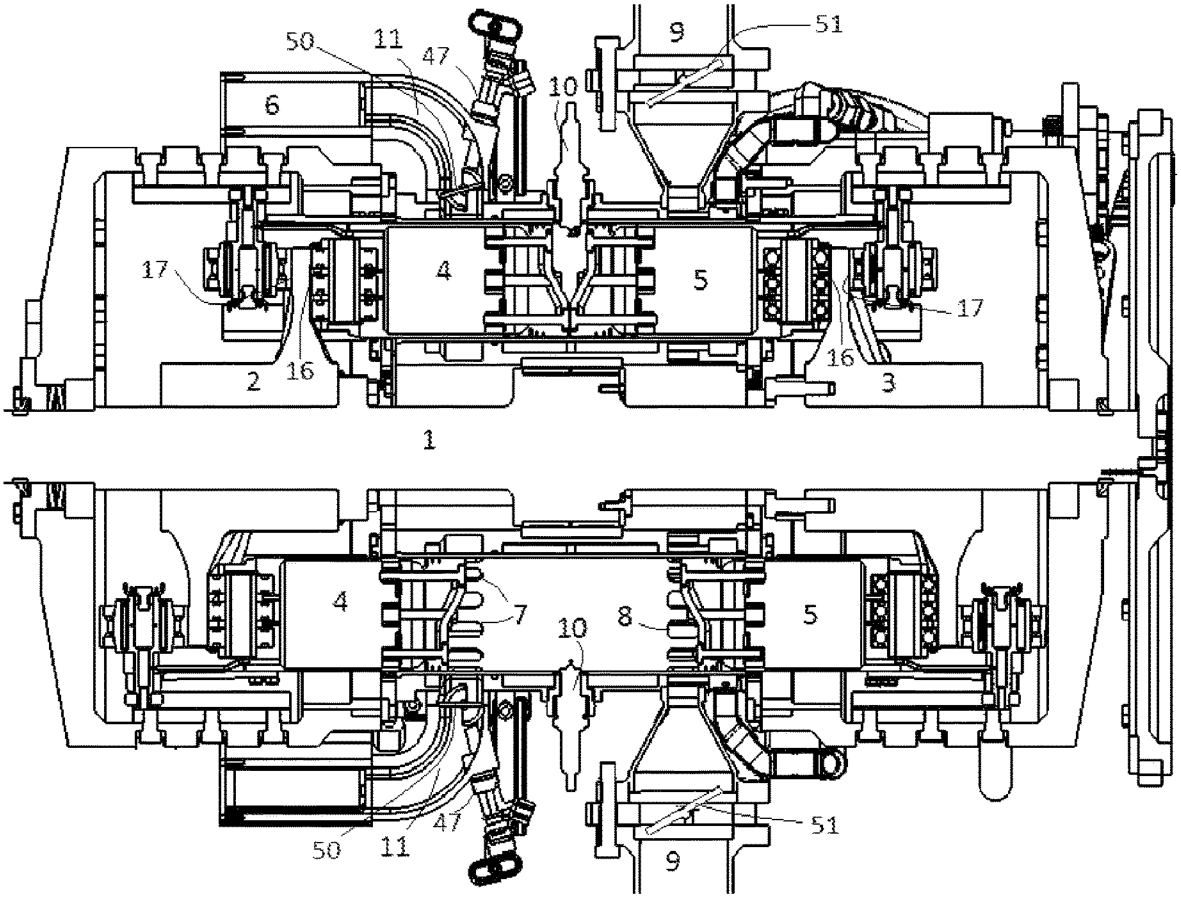
FIG. 1 shows the general features of the two stroke opposed piston axial engine via a cross section from a central plane.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

COMPONENT NUMBER REFERENCE LIST

1. Main Shaft
2. Intake Cam
3. Exhaust Cam
4. Intake Piston Assembly
5. Exhaust Piston Assembly
6. Intake Manifold
7. Intake Port
8. Exhaust Port
9. Exhaust Runner
10. Spark Plug
11. Intake Runner
12. Piston Head
13. Piston Extension
14. Primary Roller
15. Primary Roller Shaft
16. Inner Cam Surface, both exhaust and intake cams
17. Outer Cam Surface, both exhaust and intake cams
18. Secondary Roller Bracket
19. Secondary Roller
20. Secondary Roller Bearing
21. Piston Assembly Hollow Section
22. Piston Oil Injection Hole
23. Primary Roller Lubrication Hole
24. Secondary Roller Lubrication Hole
25. Secondary Roller Lubrication Pipe
26. Secondary Roller Spindle Hollow Section
27. Secondary Roller Spindle
28. Secondary Roller Spindle Holes
29. Side Load Roller
30. Anti-rotation Roller
31. Conical primary roller bearings
32. Secondary roller face profile
33. Primary roller face profile
34. Roller Profile Support Flange
35. Piston Oil Delivery Groove
36. Oil Delivery Slider
37. Oil Delivery Pipe
38. Piston Ring Oil Delivery Groove
39. Cylinder Liner peripheral Oil Distribution Groove
40. Oil Control Ring Groove
41. Cylinder Liner Peripheral Oil Distribution Groove Interruption
42. Piston Skirt Depression
43. Belleville Washer spring Pre-Load
44. O-Ring for Oil Delivery Head
45. Anti-Rotation Rail
46. Side Load Rail 47. Fuel Injector
48. Supercharger
49. Intake Hose
50. Intake Deactivation Valve
51. Exhaust Deactivation Valve
52. Deactivation Valve Sealing Feature
53. Non-Deactivated Cylinder Exhaust Pipe Junction
54. Supercharger Driving System
55. Main Throttle Body
56. Supercharger Recirculating Valve
57. Cylinder Liner
58. Deactivation Sleeve Valve
59. Deactivation Control Rod
60. Turbocharger for Cylinders not Equipped with Deactivating Hardware
61. Turbocharger for Cylinders Equipped with Deactivating Hardware
62. Coolant Entry Pipe
63. Port-Bridge Coolant Channels
64. Exhaust Port Annular area
65. Coolant Annular Area
66. Piston Cam Four stroke
67. Intake cam wheel
68. Exhaust cam wheel
69. Intake Valve
70. Exhaust Valve
71. Piston Connection Bracket
72. Cylinder Head Four Stroke
73. Intake Valve bridge
74. Valve Spring
75. Roller for Valve Opening
76. Roller for Valve Closing
77. Exhaust Valve bridge
78. Intake Port.
79. Exhaust Cam Wheel Follower
80. Follower Guide Rod
81. Exhaust Rocker Assembly
82. Exhaust Rocker Pivot
83. Intake Runner.

Figure 6A:
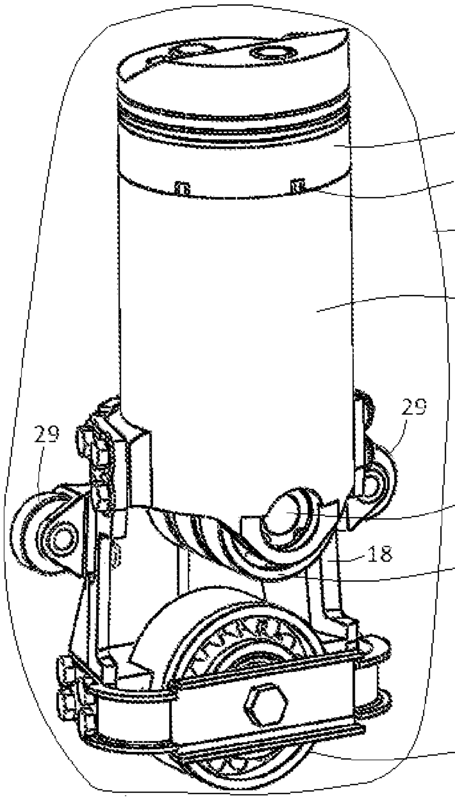
FIG. 6A-6B shows the exhaust piston assembly.
Figure 6B:
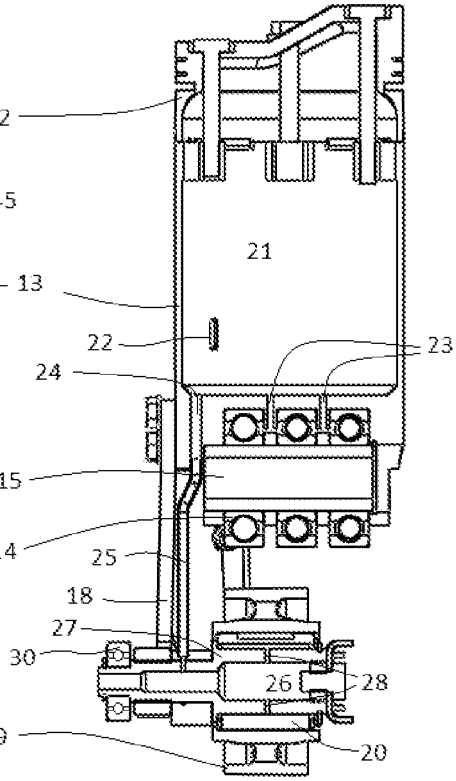

Referring to FIG. 1, the main features of the opposed piston axial engine are as follows. The Intake Cam 2 and Exhaust Cam 3 are bolted on the Main Shaft 1 and rotate with it. Intake Piston Assemblies 4 and Exhaust Piston Assemblies 5 follow the corresponding cam profiles determined by the ramps on the cams. It may not be so easy for the reader to identify what we refer as "piston assembly." However, FIG. 1 shows the engine in a position where the intake pistons are at about the inner dead center on the top and outer dead center on the bottom. By observing the relative position of the components, the reader can identify what consists of the "piston assembly." Furthermore, FIG. 6A-6B shows the Exhaust Piston Assembly 5 isolated from the remaining components, and this should help the reader identify the exhaust assembly in FIG. 1.

The intake piston assembly 4 is a mirror image of the exhaust piston assembly. Intake manifold 6 brings in compressed air into the engine which flows through intake runners 11 and enters the cylinders through Intake ports 7. The intake ports are visible only on the lower cylinder of FIG. 1 which is close to outer dead center. On the upper cylinder, the intake piston assembly 4 is close to inner dead center and has covered the intake ports 7, and therefore they are not visible. Fuel is injected via the injectors 47 as the intake air flows through the Intake Runners 11 and enters the cylinders. Spark Plugs 10 ignite the air/fuel mixtures. In this described embodiment, the engine is a spark ignition unit. However, the spark plugs 10 can be replaced by diesel injectors, and the Piston Assemblies 4 and 5 can be modified for higher compression ratio and proper charge motion, so that the engine can operate on the diesel cycle.

Also, fuel injectors 47 can be replaced with gasoline direct injection (high fuel pressure) units which can be located near the spark plugs 10. This will allow a better control of the fuel injection in a spark ignition DI version of the embodiment, and the injection can be carried out when the exhaust port is closed or almost closed, in order to minimize unburnt fuel exiting through the exhaust port during scavenging. The residual gases exit the cylinders through the exhaust ports 8, which are visible on FIG. 1 only on the lower cylinder where the pistons are close to the outer dead center position. The exhaust gasses are carried away to the exhaust manifolds via exhaust runner 9.

Figure 5:
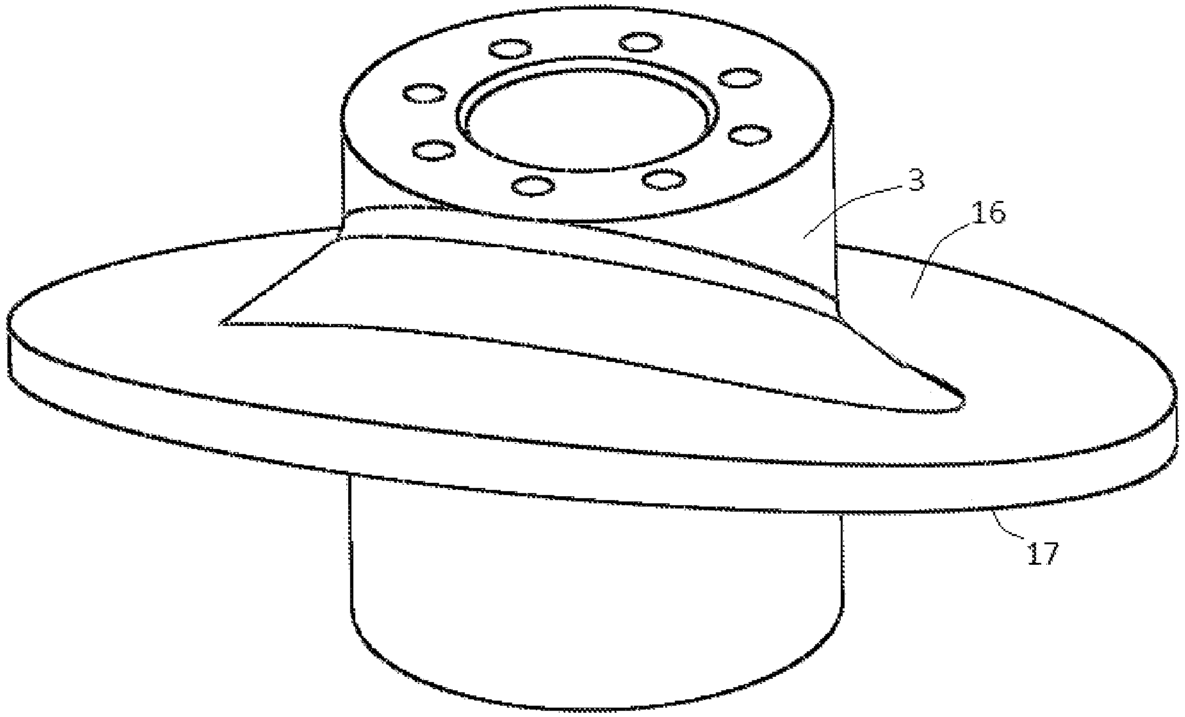
FIG. 5 shows the exhaust cam of the two stroke opposed piston engine

In order for the reader to better comprehend the geometry of the engine, the exhaust cam 3 has been isolated in FIG. 5. The side closest to the viewer is the inner dead center peak where the slope of the cam is steeper in order to reduce the inner dead center dwell. This subtle detail is of course not visible in FIG. 5. Slope in this case can be defined as the ratio of rate of axial position change divided by change in angular location. This slope is of course not constant and it varies with angular location. It is not obvious by looking at the picture, but the cam is shaped, as mentioned above, such that the dwell in inner dead center is shorter than the outer dead center, so that the slope is steeper close to the inner dead center.

This helps the scavenging efficiency and the thermal efficiency; this type of optimization is not possible with a regular crank-connecting rod design. Another characteristic of the cam of FIG. 5 is that there is only one piston reciprocation per shaft rotation, for one complete two stroke cycle for every engine revolution. This cam can be redesigned with two reciprocations per cam rotation. That will lead to two complete engine cycles per engine revolution, which will double the torque of the engine. The downside of this is of course increase in the cam inclination (slope) and therefore piston side load, but as discussed above, there are provisions in the design to react out this side load on anti-friction bearings with very low friction, which will be described below.

The exhaust piston assembly 5 is isolated and shown in FIG. 6A-6B. The intake and exhaust piston assemblies are generally similar, and consist of the following features. The piston head 12 is the upper part of the piston that contains the piston rings, and it is press fitted or bolted (as shown in FIG. 6A-6B) to the lower portion of the piston, the Piston Extension 13. The Primary Rollers 14, which are roller element bearings, are supported by Primary Roller Shaft 15. The Primary Rollers 14 engage the inner curved surface of Exhaust Cam 5 in order for the piston assembly to follow the cam surface with minimum friction. Primary roller 14 transfers primarily compression and combustion load on intake cam 2 or exhaust cam 3.

In this embodiment, primary roller 14 consists of three deep groove ball bearings, but any type of roller element bearing can be used, such as cylindrical roller bearings (instead of three, there could of course be four roller elements on a larger bore engine, or two on a smaller bore engine). However, there are certain parts of the cycle, especially at higher engine speeds and lower loads, where inertia loads dominate over pressure forces, and these can force the piston assemblies to disengage the inner cam surface 16 and move uncontrollably towards the inside of the engine. For those times, secondary roller 19, supported by secondary roller bracket 18, engages the outside surface cam surface 17, in order to ensure the piston assemblies follow the prescribed motion at all times in the cycle and all operating conditions. In this embodiment, secondary roller 19 uses a needle bearing 20 which allows its rotation with minimal friction, but other roller element bearings can be used.

Further referring to FIG. 6A-6B, the intake piston assembly 4 and exhaust piston assembly 5 have a hollow section 21, and a piston oil Injection hole 22 (in this embodiment, the hole is long, similar to a slot). Through a mechanism that will be shown further down in this document, oil is injected inside this cavity. This quantity of lubricant that is enclosed in this cavity is forced to splash/bounce between the top and bottom surface of cavity 21 as the piston reciprocates, and therefore absorb some of the combustion heat from piston head 12. Furthermore, this lubricant quantity is used to lubricate the primary and secondary rollers.

Primary roller lubrication holes 23 allow some of the oil trapped in the cavity 21 to escape and lubricate the primary roller bearings 14, a feature which allows the oil trapped in piston cavity 21 to be constantly renewed. Provisions are also made to supply with the secondary roller bearing with lubricant. Secondary roller lubrication holes 24 allow oil to flow into secondary roller lubrication pipe 25 which transports oil to the hollow part 26 of secondary roller spindle 27. This oil flows through the secondary spindle holes 28 and directly lubricates secondary roller needle bearing 20.

Further referring to FIG. 6A-6B, the intake piston assembly 4 and exhaust piston assembly 5 are equipped with two side load rollers 29. These ae mounted on secondary roller bracket 18. These rollers are roller element bearings that engage fixed rails on the engine block, deep groove ball bearings in this case. Most of the side load generated by the cam inclined surface is reacted out on these anti-friction bearing instead of the piston skirt. As described above, this provision marginalizes the limitation caused by side load and therefore allows for steeper cam inclination for optimizing the piston motion for scavenging and/or increasing the number of thermodynamic cycles per main shaft rotation. However, in order for the above provision to work best, an additional method that prevents the piston assembly from rotating with better mechanical advantage can be used. For this reason, the anti-rotation roller 30 is provided, in the case of FIG. 6A-6B, conveniently installed on the secondary roller bracket shaft 27. These rollers also engage fixed rails, which are shown later in the document.

With respect to the side load rollers 29, it needs to be pointed out that the rollers could be installed on the engine block or frame (stationary) and the rail could instead be on the piston assembly.

The proposed two stroke opposed piston axial engine also shares some features with the engine described by Juan in EP3066312B1. There are some important differences, however. The engine described by Juan has no provision of reacting out the side load generated on the piston by the tilted cam profiles. This side load will be inevitably transmitted to the piston skirt, with likely high piston friction and wear.

One other difference with the engine disclosed by Juan relates to the thrust load needs of the main shaft. As seen in FIG. 1, the pressure load acting on each individual piston are equal in magnitude to the opposite piston pressure load and therefore the forces applied on the central shaft 1 are cancelled out. In other words, the net piston gas pressure force on the shaft is zero. The inertia piston forces are also almost cancelled out (not completely due to the small phase shift between the intake and exhaust pistons). This feature leads to the requirement of a rather small thrust bearing for the main shaft 1. On the other hand, the engine proposed by Juan, has a complex mechanism of modifying the intake and exhaust cam phasing as the engine runs. This forces the Juan design to have two separate shafts instead of a single main shaft 1, and therefore large thrust bearing provisions are necessary, which increase weight and mechanical friction, while the benefit of active adjustment of the intake/exhaust piston phasing is small for most applications.

The proposed two stroke opposed piston axial engine also shares the piston side load and anti-rotation provision feature with the engine described by Alfaro. However, Alfaro did not use roller element bearings for this purpose. Alfaro uses two cylindrical stationary rails, and two holes on the piston that engages these rails (this can be described as a sliding linear bearing). Alfaro does not describe any hydrodynamic features that could build fluid lubrication between the cylindrical rails and the corresponding piston assembly cavities which could have reduced the friction caused by the piston side load. However, even if hydrodynamic lubrication features were prescribed, since the piston reciprocates, and since the peak loads tend to occur close to the ends of the strokes where the piston sliding speed is too low for fluid lubrication, the Alfaro patent side load provision cannot operate with the low friction offered by anti-friction roller element bearings as this invention does. However, the dual linear bearings disclosed by Alfaro do operate as anti-rotation features, but again with relatively high friction and bulk.

The primary roller system of FIG. 6A-6B has the following kinematic characteristic. The linear velocity of any point in the cam surface 16 or 17 is proportional to the distance from that point to the axis of rotation. Each point has a slightly different linear speed from a nearby point where the radial distance from the rotation axis differs by a small amount. This linear velocity can be calculated by the product of the cam angular velocity ω and the radial location R ($V_{linear}=\omega\cdot R$). Referring to FIG. 6A-6B, there are three primary rollers 14, the outer race of which has a distinct angular velocity, the one further away from the cam axis of rotation spins the fastest, while the one closest spins the slowest. It is expected that the angular velocity of each of the rollers to be proportional to the linear velocity of a point on the cam surface 16 that is located to about the middle of the contact patch of the roller's outer race and cam surface 16, where the linear velocity of the cam surface and the roller surface are exactly equal. Exact equation for the roller angular velocity is $\omega=V_{linear}/R$ where R is now the roller radius and ω is the roller angular velocity and $V_{linear}$ is the linear velocity of that point near the center of the contact patch where the linear velocities of the roller and cam are exactly equal. Unfortunately, the linear velocity of all the points of the roller surface on the contact patch are equal and proportional to the roller angular velocity, while the linear velocity of the cam surface points on the contact patch are proportional to the radial distance from the axis rotation.

Therefore, there is a slight mismatch on the linear velocities of the two surfaces away from the middle of the contact patch, and the mismatch increases further away from that middle. In other words, we do not have pure frictionless rolling. As a result, some slippage takes place, which creates friction and thus energy loss. In order to minimize that effect, instead of one relatively wide (axially) primary roller, three distinct primary rollers 14 are provided, which have three distinct angular velocities and three distinct centers of contact patches with perfectly matching linear velocities. Obviously, a larger number of rollers can be used to minimize that effect, but three are shown in the preferred embodiment, as applied to the size of this particular engine. In any design there are compromises and in this case, the compromise exists between the energy lost from the slippage and the number of rollers that can be packaged in the existing piston size (smaller diameter primary rollers will increase contact stresses in both cam and roller, so there is a limit in the outside diameter). In fact, the secondary roller does not get the benefit of multiple rollers because the loads it experiences are lower and have a more brief duration.

The kinematics described above apply only for the very top and bottom of the cam surface 16 where the cam slope (as defined above) is zero. As the cam slope deviates from zero away from inner and outer dead center, the calculation of the linear speed becomes more complicated because the inclination needs to be taken into account. This local inclination, even for a given angular location on the cam, increases as the radial distance to the axis of rotation decreases, which complicates considerably the kinematics of this speed mismatch.

Figure 7A:
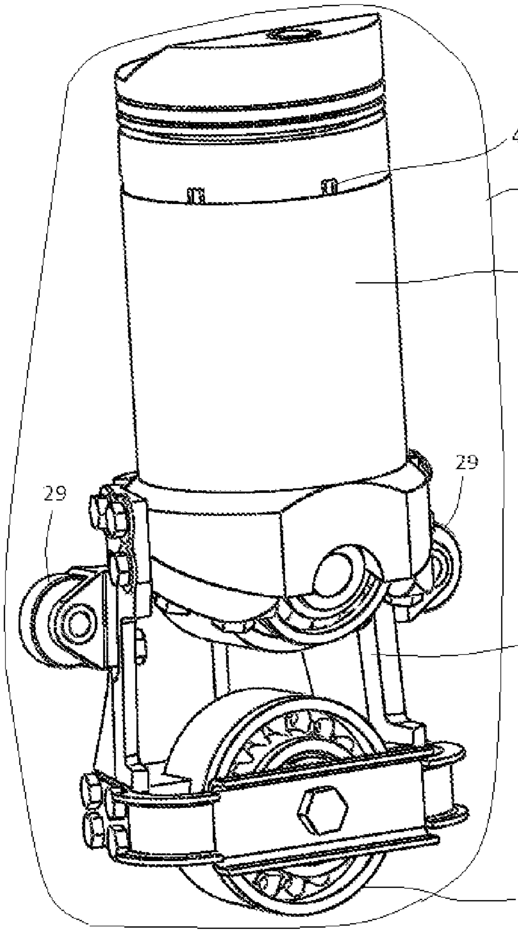
FIG. 7A-7B shows an alternate way for designing the piston assembly.
Figure 7B:
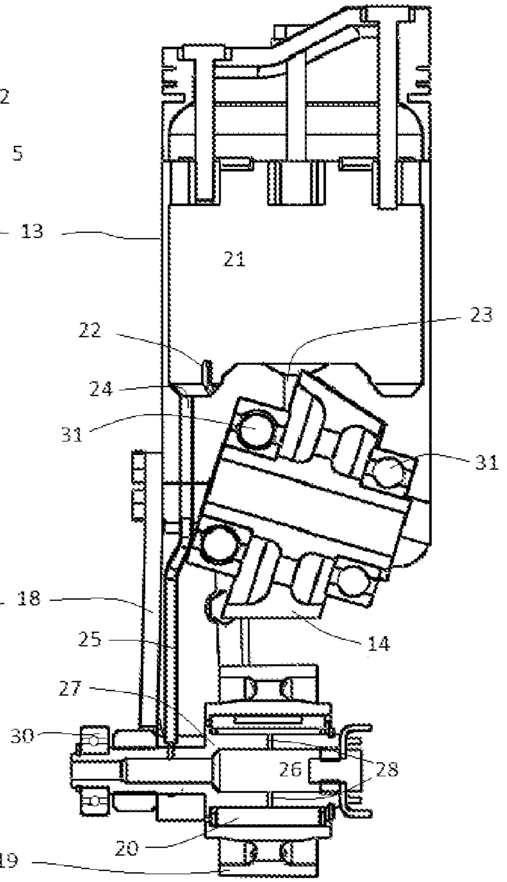

Modern numerical methods are used in order to calculate the variation of cam surface linear speed for every radial position as a function of cam slope (which of course depends on piston position). These results were analyzed in order to obtain a conical roller profile that can achieve the best compromise for optimum linear speed match for all piston positions, weighed of course by the loads calculated for each piston position. For example, the maximum load at full load and high speed for the exhaust cam when both inertia and pressure forces are considered is about 30 degrees before inner dead center, but because the exhaust cam can be up to 15 degrees ahead of the intake cam, the maximum load is about 45 degrees away from the cam peak where the effect of inclination is high. The result of this analysis and optimization process is the roller profile of FIG. 7A-7B. As seen in FIG. 7A-7B, primary roller 14 now has a conical shape, and the variation in roller radius is the result of a careful compromise aimed at minimizing slippage throughout the cycle. Two roller element bearings 31, preferably of the type that are designed for both axial and radial load, such as tapered roller or angular contact bearings, are used to allow the primary roller 14 to rotate with minimal slippage and friction as it rides on the cam surfaces 16 and 17. The axis of rotation of the roller is inclined by the angle calculated by the above optimization analyses (the roller shaft 15 of FIG. 6 is now part of primary roller 14), such that the contact patch remains perpendicular to the axis of rotation of the main shaft. This optimized tilt angle of the roller shaft minimizes the energy loss due to slippage between the roller and the cam.

In the piston assembly of FIGS. 6 and 7, the secondary roller remains generally cylindrical because it is subjected to lower loads. However, a similar analysis and optimization can also be carried out to the secondary roller resulting also in a conical shape and inclined shaft.

It needs to be mentioned that Alfaro in U.S. Pat. No. 2,080,846 also describes a conical shape roller. Based on Alfaro's description, Alfaro calculated the conical inclination only based on the radial distance variation from the shaft, so in Alfaro's engine, pure rolling with minimum slippage occurs only in the two extremes of piston motion, the inner and outer dead center where the cm slope is zero where the loads are not the highest. So, the optimization described above was completely skipped by Alfaro, leading to a less optimal design. Furthermore, Alfaro is not using roller element bearings for supporting the conical roller, but plain journal bearings. The downside to journal bearings is that they require a pressurized supply of lubricant, especially at high speeds, which is particularly difficult to provide for this application because the piston assembly (which is the base of the journals) is not fixed but reciprocates at high rates, so the oil supply tubing will have to follow this reciprocation. The roller element bearings used by this invention typically require a small amount of lubricant, which is provided at low pressure (splash lubrication) as described above.

Figure 8A:
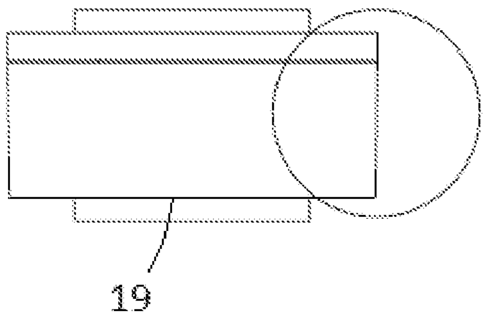
FIG. 8A-8B shows details of the secondary roller conical profile details.
Figure 8B:
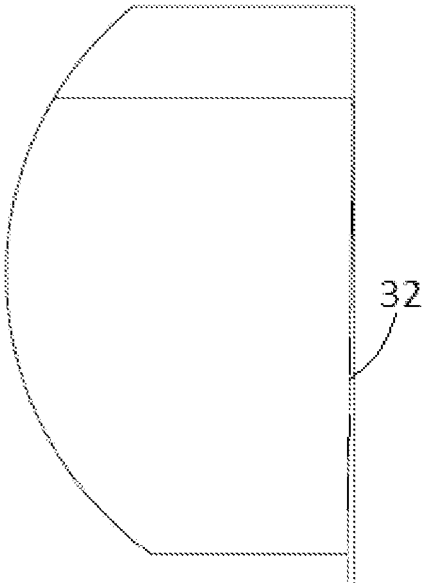

One important design feature of the secondary roller 19 is shown in FIG. 8A-8B. FIG. 8A-8B shows a magnification into the profile of the contact rolling area of roller 19. Even though the rolling surface appears to be a cylinder, there is actually a slight taper on the profile, which is of the order of a fraction of a millimeter. The purpose of this taper is that based on the calculated loads, the bracket 18 will bend elastically by an amount that can be calculated, so the shaft 27 will deflect and will not be perfectly parallel to the cam surface 17. This taper is provided in part to ensure that the contact stresses are well distributed, which reduces the peak value. Another reason is to bias the contact forces closer to the bracket, which in turn reduces the bending moment on the bracket 18, and only when the loads increase will the remaining portion of the roller face contribute to the contact stresses. Thus, a lighter bracket can be used, which reduces the inertia loads further. This in turn reduces the loads on the roller.

Figure 9A:
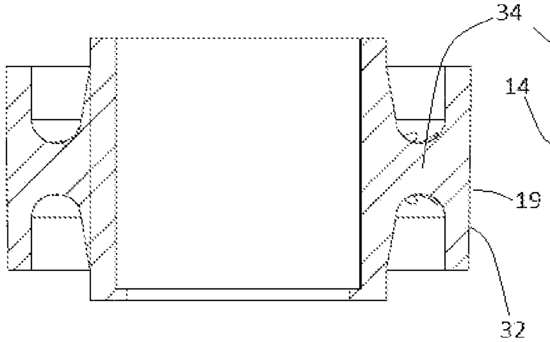
FIG. 9A-9B shows cross sections of the primary and secondary rollers.
Figure 9B:
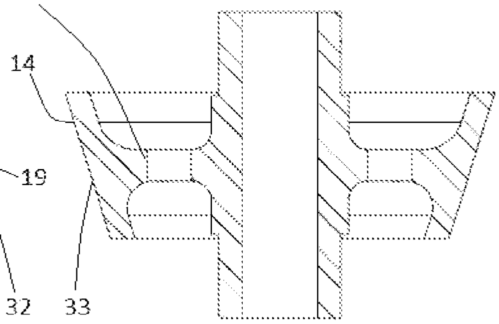

FIG. 9A-9B shows cross sections across a plane passing through the axis of rotation of the secondary roller 19 and the conical style primary roller 14. The primary profile cylindrical or conical section is supported by a relatively narrow flange 34, which supports the face structures in only the general central region. In addition to reducing the roller weight, the benefit of this arrangement is that the roller race profiles 14 and 19 are relatively compliant, so as the cams 2 and 3, bracket 18, or shaft 27 bend under the operating loads (which are over 3,000 lbs in the engine shown), the profiles can also tilt elastically by a small amount and follow the cam surface, which again allows for a better distribution of the contact stresses, and avoiding localized high contact stresses. It needs to be understood that these elastic distortions are too small to significantly affect piston location within the cycle, but could affect distribution of contact stresses because the surface deformations of the roller/cam contact area are very small. If the contact stress is not distributed throughout the apparent contact area, the stress could be too high and damage the cam and/or roller surface material.

Figure 10:
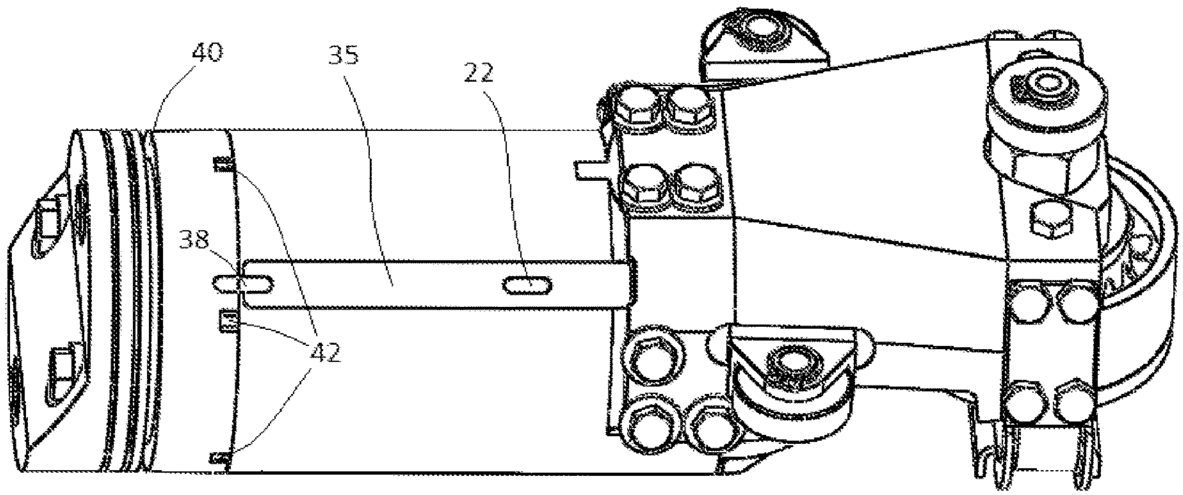
FIG. 10 shows details of the lubricant circulation in the piston assembly.
Figure 11A:
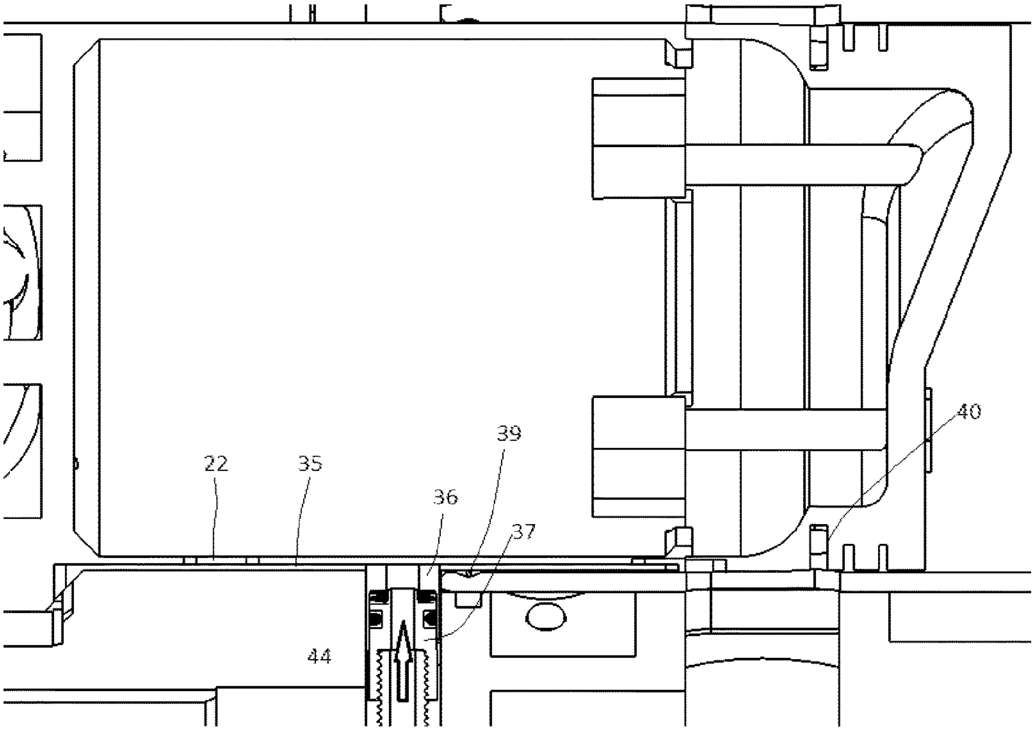
FIGS. 11A-11C show details of the lubricant circulation in the piston assembly.

Next, the oil delivery mechanism to the piston assembly is described. FIG. 10 shows one of the piston assemblies, where the piston oil injection hole 22 is visible, from the outside this time (in FIGS. 6B and 7B, this hole was shown from the inside). On the outside of the cylindrical face of the piston, piston oil delivery groove 35 is cut in such a way that it coincides with the oil injection hole 22. FIG. 11A shows a cross section of the engine of FIG. 1 along a plane that passes though the piston axis and is also perpendicular to the face of piston delivery groove 35, so as oil delivery groove 35 is clearly visible. Oil delivery slider 36 is spring loaded against the piston oil delivery groove 35 by a fixed oil delivery pipe 37. More details of this arrangement can be seen in FIG. 11B. Oil is pressurized in the oil delivery pipe 37 and the oil pressure energizes a flow in the direction that the arrow is showing. However, in the instant shown in FIG. 11A, the oil delivery slider's opening is blocked by the piston oil delivery groove 35 face, so the oil flow is mostly blocked. As the piston reciprocates, however, the oil injection hole 22 at some point briefly coincides with the oil delivery slider 36 opening, and during that brief part of the cycle, oil enters the piston cavity 21.

Figure 11B:
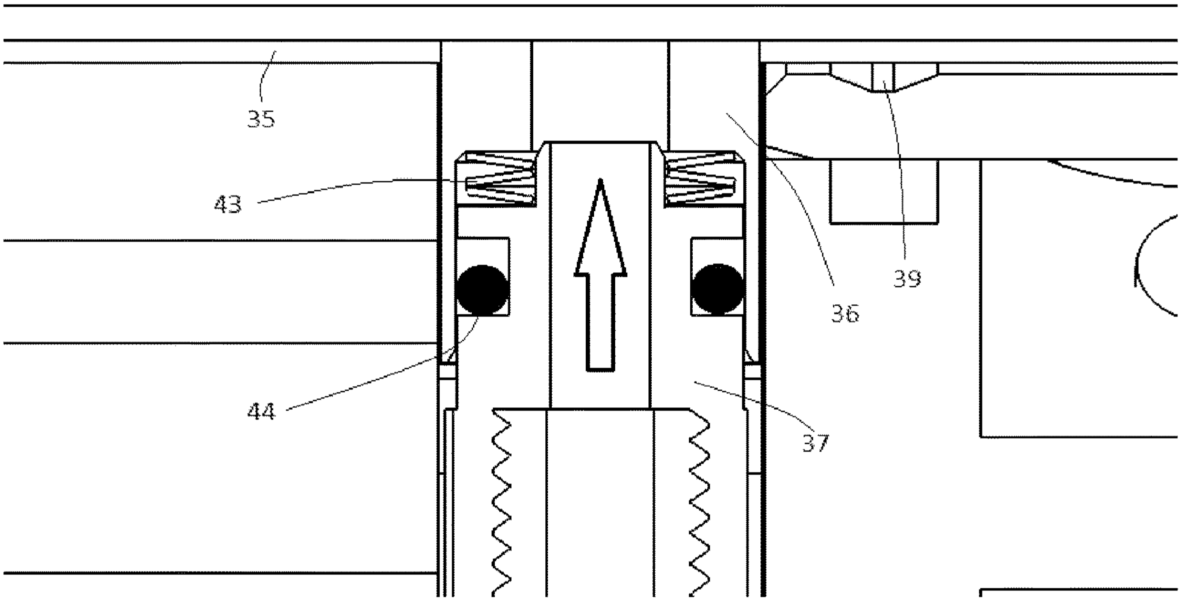

As described above, this oil accumulates in cavity 21, and bounces up and down removing heat from the piston head 12. Also, some portion of this oil quantity flows out through the lubrication holes 23 and 24 in order to lubricate the secondary rollers. The size (slot length) of the oil injection hole 22 is carefully tuned so as to have sufficient volume of oil for cooling and lubrication, but not too much to increase the effective mass of the piston assembly, which could overload the piston assembly rollers. FIG. 11B shows the details of the oil delivery head arrangement. The section of the stationary tube 37 and the free to move axially (along the axis of tube 37) oil delivery head 36 are visible. The oil delivery head 36 is spring loaded against the piston oil groove 35 face with a set of Belleville washers 43. However, other types of spring can be used. The degree of spring load force is carefully tuned so that the total spring force divided by the contact area between oil delivery head 36 and piston oil groove 35 is slightly higher than the pressure of the delivered oil. This will allow the hydrostatic support to take most of the spring load, while maintaining a tight film thickness between the oil delivery head 36 and piston groove 35 to minimize the loss of lubricant outside the groove (any quantity of pressurized oil that fails to reach its destination represents an energy loss via excess work from the oil pump).

Figure 11C:
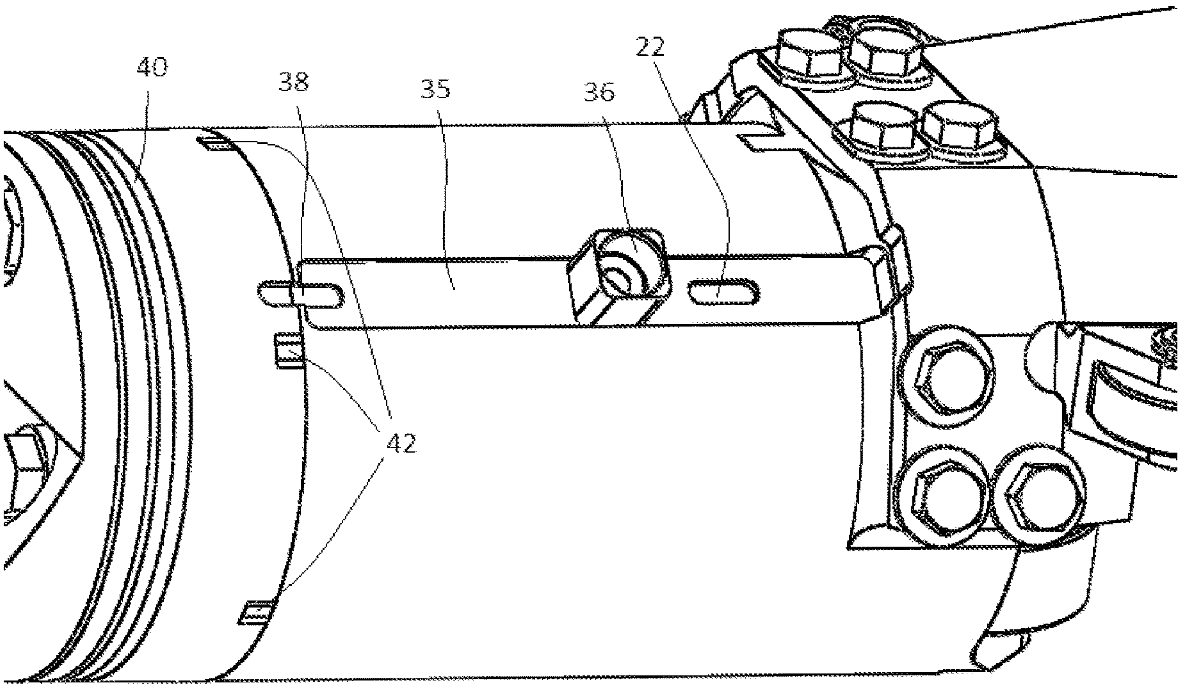

Because oil delivery head 36 is movable with respect to the fixed oil delivery pipe 37, some means of sealing between these two parts can be used in order to eliminate any wasted oil flow. In this case, an O-ring 44 is used for this purpose. FIG. 11C shows the piston assembly removed from the engine, and the oil delivery head 36 fitted into groove 35 exactly as it is fits in the assembled engine. In this embodiment, oil delivery head 36 is mostly of rectangular cross section in order to minimize the oil leakage when inserted in groove 35 and when the hole of oil delivery head 36 does not coincide with oil hole/slot 22.

In FIG. 11C, piston ring oil delivery groove 38 is visible. Unlike the oil injection hole 22 (which also has a long shape, like a slot), the oil delivery groove 38 is only a depression, and not a through hole on the piston wall. The purpose of this arrangement is to provide lubrication to the oil control rings, which in turn will transport it along the cylinder for lubricating the compression rings. In typical engines, when the piston is close to top dead center, oil leaking off from the connecting rod bearings or from special jets wet the lower and mid part of the cylinder liner, so as the piston is moving towards bottom dead center, the oil control ring can collect lubricant within its rails and distribute it on the liner as it continues to reciprocate. In this engine architecture, however, the piston assembly is long and constantly covers the cylinder liner, even when the piston is all the way “up” at its inner dead center. Therefore, a mechanism is needed to provide an oil supply to the oil control rings. This mechanism is described here. As the piston approaches outer dead center, the oil delivery head 36 is now at the end of groove 35 and coincides with piston ring oil delivery groove 38. Pressurized oil flows along the oil delivery groove 38 for that portion of the cycle, which lasts about 25 degrees of rotation of the main shaft rotation. The other end of oil delivery groove 35 meets a peripheral oil distribution groove 39 on the cylinder liner (FIG. 12) during the same interval in the engine operation.

Figure 12:
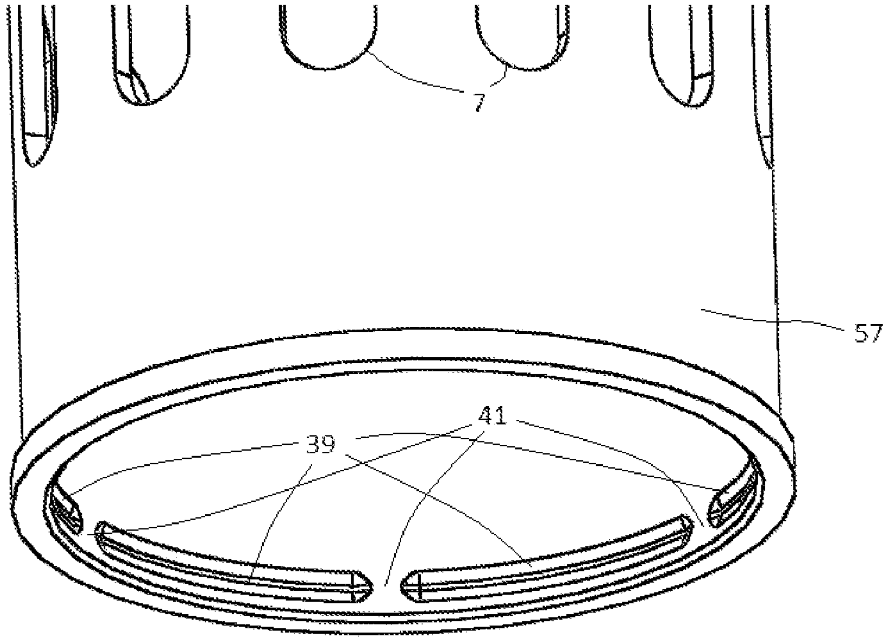
FIG. 12 shows the details of oil supply to the cylinder liner and piston rings.

FIG. 12 shows the end of one of the four cylinder liners of the preferred embodiment, the two stroke opposed piston engine of FIG. 1 (intake port 7 is also pointed out, in order to help the reader’s perspective). The preferred embodiment has separate from the block wet liners, cylinders which can be removed and isolated from the block, but the features described here apply also to cylinder liners that are integral to the block. Near the end of the cylinder liner, the cylinder liner peripheral oil distribution groove 39 is visible (the opposed piston engine embodiment has a similar feature to the other end of the cylinder liner, so that both pistons share the same style of oil distribution for their piston rings and skirts). FIG. 11A and FIG. 11B also show the cylinder liner peripheral oil distribution groove but from a different perspective. This groove transports the oil from the piston oil delivery groove 38 all around the cylinder, and oil wets with lubricant the piston and cylinder clearance. As the piston moves towards the inner center, a substantial quantity of this oil will be dragged inwards by the piston surface and deposited in the cylinder liner area where the oil control ring reaches (oil control rings are located in oil control groove 40, the oil control ring is not illustrated). The oil control ring, in turn, will distribute a given oil quantity of lubricant all along the cylinder liner, do that the compression rings are also lubricated. This quantity of oil will of course lubricate the piston skirt, as small portions of the side load will inevitably be reacted out between the piston skirt and the cylinder liner. Observing FIG. 12, the reader will notice that cylinder liner peripheral oil distribution groove 39 is not continuous but has interruptions 41.

These interruptions are necessary in order to install the pistons with the pinned piston rings. During installation, if groove 39 was continuous, the piston rings would expand in the groove and would cause the piston to get stuck (during engine operation, the rings do not travel far out enough to overlap with groove 39, in other words, the groove 39 is outside the stroke of the piston rings). In particular, if the piston ring end gaps fall into the groove 39, the piston will get stuck and not be possible to be installed inside the cylinder without damage to the piston rings. So, these interruptions 41 support the piston rings during installation preventing their undesired expansion and are intended to be aligned with the piston ring end gaps. So during piston installation, they will directly support the whole ring periphery and specifically the ring end gaps and keep the end gaps closed as they cross the groove. This ensures safe installation. Also, in the preferred embodiment, the two axial stroke opposed piston of FIG. 1, needs to have the piston rings pined, so that these will never rotate and their end-gap would never coincide with one of the twelve intake ports 7 or twelve exhaust ports 8. If that happened, rapid ring wear could take place.

FIG. 12 shows the cylinder liner of the opposed piston two stroke embodiment, the interruptions 41 are clocked in an angular location such that they lie between ports 7. Similarly, the piston ring groove pins (not shown) that restrain the piston ring end gaps are also installed in appropriate angular locations such that the piston ring end gaps are placed in angular locations that coincide with the liner oil distribution groove interruptions 41. Of course, it seems natural that these interruptions would restrict the peripheral distribution of oil, and perhaps areas of the liner opposite to the oil delivery groove 38 may get starved from oil. In order to remedy this possibility, the piston skirt is equipped with depressions 42 (FIG. 11C) which coincide with the interruptions 41 when the piston is in the area when the oil delivery slider 36 communicates with oil supply groove 38. Therefore, the oil delivery is for the most part unobstructed by the interruptions 41.

Figure 13:
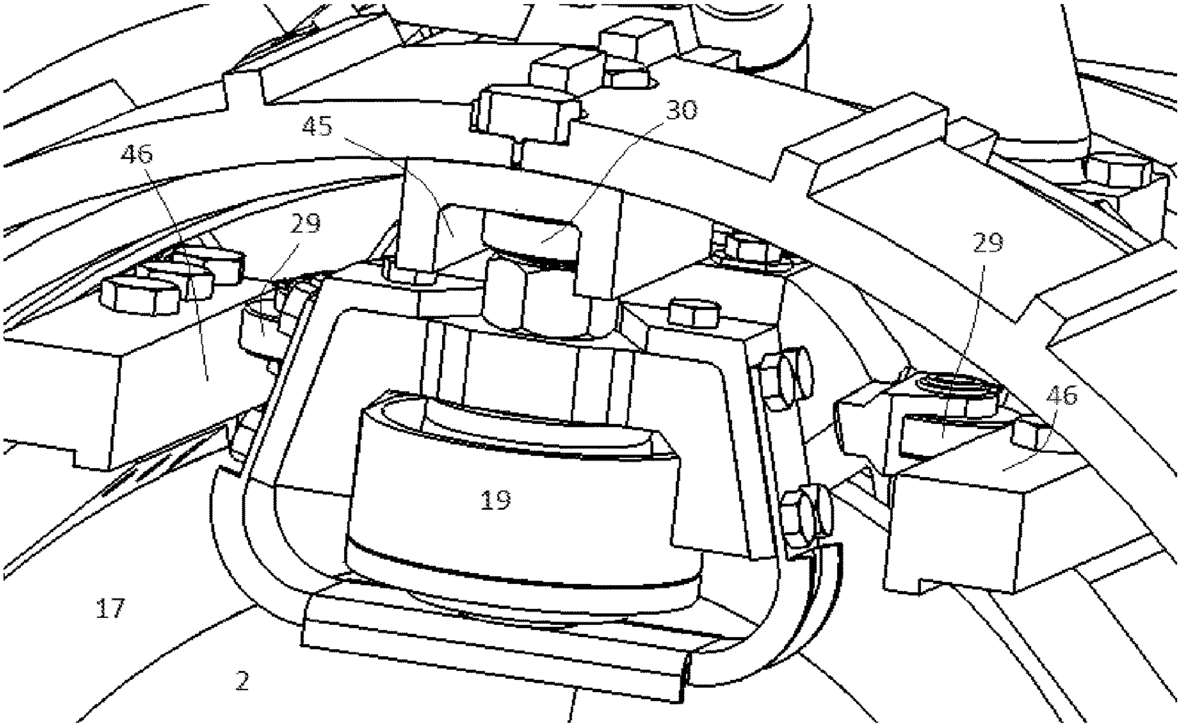
FIG. 13 shows details of the piston side load reaction and piston anti-rotation features.

FIG. 13 shows a cross section of the opposed piston two stroke axial engine of FIG. 1 from a plane perpendicular to the main axis. The view shows the exhaust cam 2 looking towards the center of the engine. The main purpose of this figure is to show how the anti-rotation and side load reaction via the roller element bearings 29 and 30 are arranged in this preferred embodiment. Anti-rotation rail 45, bolted on the reinforced engine cover, engages piston assembly anti-rotation roller 30 so that the piston angular orientation remains constant. Side-load rails 46 are bolted on the central block and engage piston assembly side load rollers 29. It can be argued that the combination of side-load rails 46 and piston side load rollers 29 would have been sufficient to also prevent rotation, but the anti-rotation rail 45 combined with roller 30 also contribute reacting out the side load generated by secondary roller 19, and prevent rotation at a much better mechanical advantage, reducing load on rollers 29.

In this section, the unique feature of cylinder deactivation for the two stroke opposed piston axial engine is presented. This feature is also contrasted to the prior art. It is generally recognized that there is an exhaust tuning benefit for two stroke engines when the number of cylinders is three or multiple of three. The exhaust tuning benefits scavenging efficiency. The two stroke opposed piston axial engine of FIG. 1, which is a four cylinder, can be redesigned into a three, or six cylinder, while all the features described can still be applied. However, there is an advantage to the four cylinder configuration, as will be described below. The engine of FIG. 1 is designed such that two of the four cylinders can be deactivated while the engine operates at low load. Cylinder deactivation allows the engine to operate with two cylinders at a higher mean effective pressure (MEP) to meet the load demand, instead with all four cylinders at a lower MEP. It is well known in the art of internal combustion engines that it is not desirable to operate the engine at very low MEP because heat loss and internal friction tends to significantly reduce brake thermal efficiency. Therefore, the described cylinder deactivation considerably improves fuel economy under low load operation.

This is particularly significant for a two stroke engine, because the scavenge air flow can be reduced if one or more cylinders is not operating by an amount almost proportional to the number of cylinders deactivated divided to the total number of cylinders (i.e., in this four cylinder engine, when two cylinders are deactivated, the scavenge air flow and associated power required is reduced by about 50%). Scavenge air flow is generated by a supercharger which consumes mechanical energy, therefore reducing the demand for scavenge airflow also reduces the supercharger parasitic power and increases engine power output and thermal efficiency. When two opposite cylinders of the engine of FIG. 1 are deactivated, the engine continues to be an even firing engine (firing every 180 degrees of main shaft 1 rotations), and therefore is reasonably smooth. If the engine was a three cylinder, however, deactivating one cylinder would generate uneven firing and rough operation, plus the exhaust tuned scavenging benefit of the three cylinder would not work under deactivated conditions.

In a six cylinder however, smooth operation could be achieved by deactivating three coupled cylinders, similarly to deactivating the two coupled cylinders in this embodiment. The two three cylinder groups that are activated/deactivated will obviously be the sets of cylinders 120 degrees apart so that the three cylinder tuning characteristic of two stroke engines can be exploited even when one group of cylinders is deactivated. Therefore, the deactivation scheme that is described in the following paragraphs is well suited to a six cylinder opposed piston two stroke axial engine.

Figure 14:
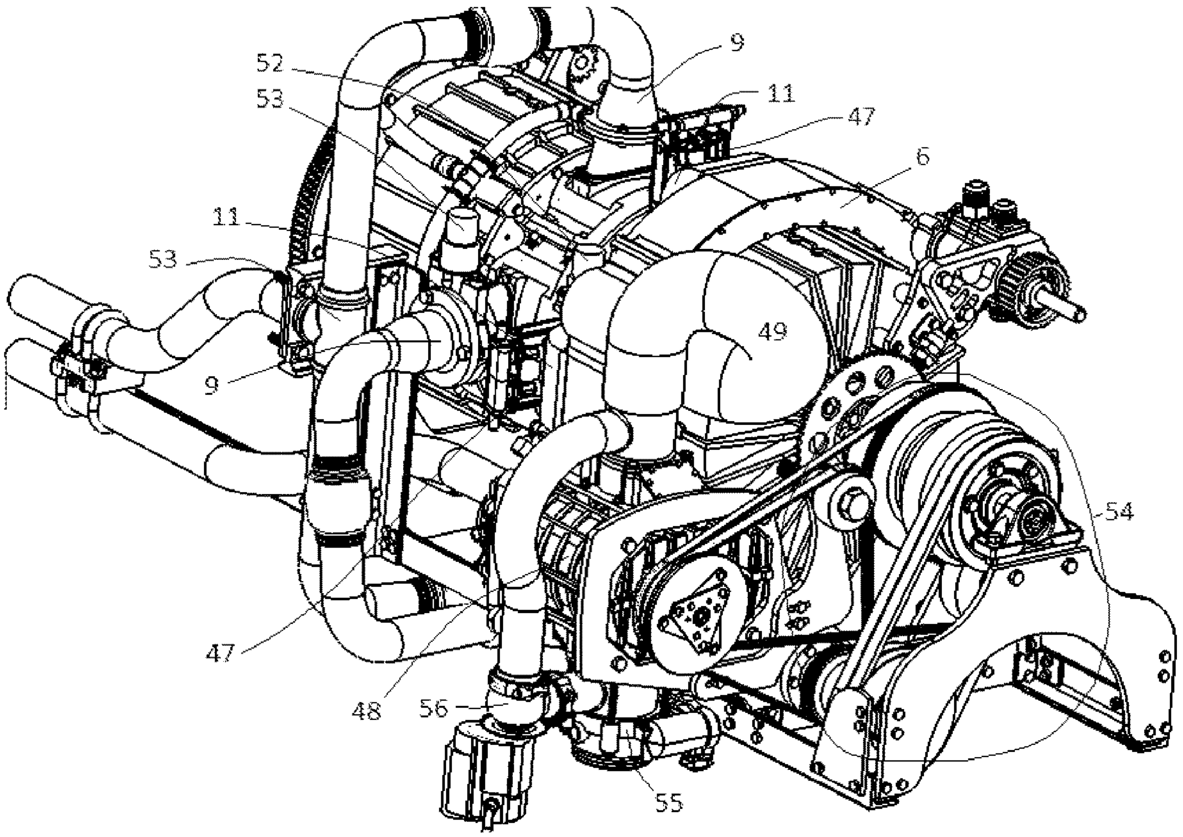
FIG. 14 shows the overall two stroke opposed piston axial engine embodiment, identifying intake and exhaust components, cylinder deactivation components, etc.

In order to best illustrate the merits and features of the cylinder deactivation for the four cylinder opposed piston axial two stroke engine of FIG. 1, some of the details of the intake and exhaust system are shown in FIG. 14. Like all two stroke engines, a supercharger 48 is necessary, which is channeling intake air into the intake manifold 6 (which is annular and surrounds the axial engine) through intake hose 49. Intake runners 11 (which are also shown in FIG. 1) guide the compressed air into the intake ports 7 and air enters the cylinders when the intake ports are uncovered by the intake pistons 4. Fuel is injected into the intake stream via fuel injectors 47. (In a different embodiment, the injectors 47 can be of the "direct injection" type and located close to spark plugs 10 for a direct injection spark ignition engine, or replacing the spark plugs 10 for a compression ignition engine.) In FIG. 14, two exhaust runners 9 are also visible, as they are in FIG. 1. In the engine shown in FIGS. 1 and 14, only two of the opposite cylinders are equipped with deactivation hardware (in this case cylinders number 2 and 4, which are the cylinders located in the sides; the cylinders on the top and bottom are number 1 and number 3, respectively). In a different embodiment, all four cylinders can be equipped with deactivation hardware so as not to deactivate the same pair of cylinders all the time, and therefore spread the wear to all cylinders evenly The electronic control unit determines which pair of cylinders is deactivated. The cross-section plane of FIG. 1 coincides with the axis of these two cylinders that are indeed equipped with deactivation hardware This cross sectional plane is horizontal based on the perspective of FIG. 14.

Figure 15:
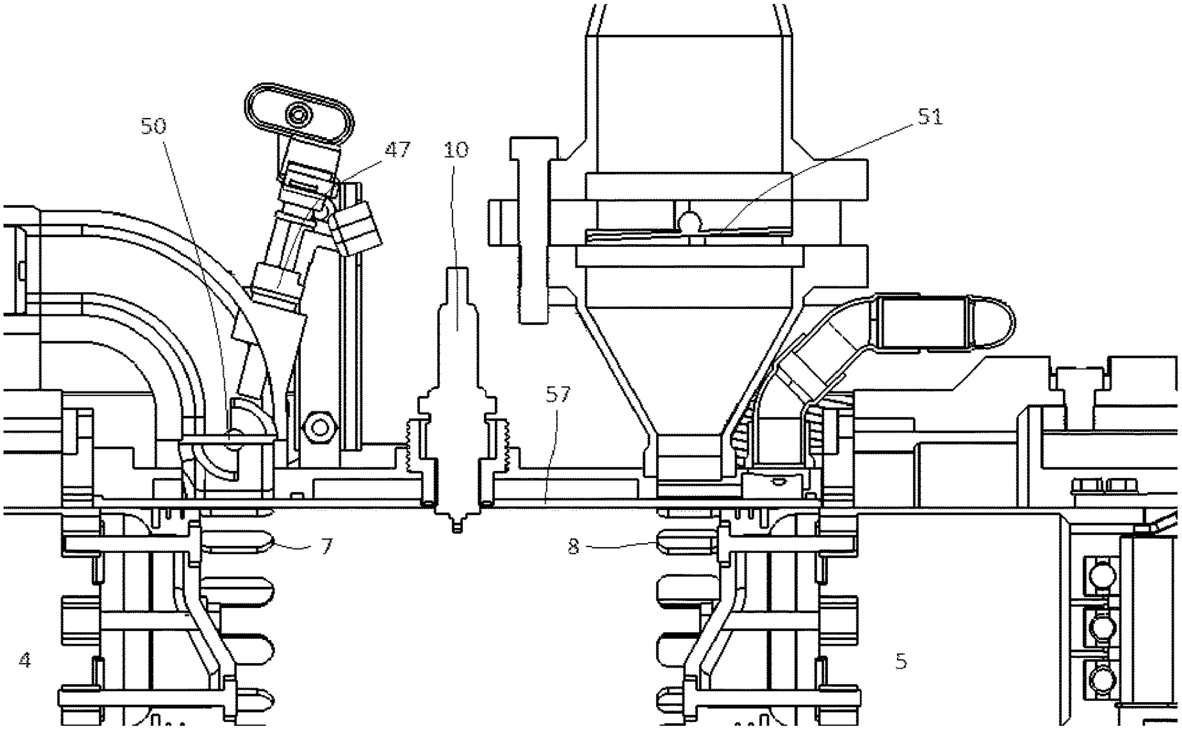
FIG. 15 shows intake and exhaust valves related to the cylinder deactivation.

The deactivation hardware is composed of valves that block the intake ports 7 (50) and exhaust ports 8 (51), and also the valve activating hardware, which are servo motors (but manual operation is also possible). Valves 50 and 51 block the intake and exhaust ports respectively in such a way that the closed valves accomplish a fairly effective gas seal (better seal than the typical throttle body valves when they are fully closed). The valve orientation is illustrated in FIG. 15, which is a close-up of FIG. 1 in the relevant area. In FIG. 15, the intake deactivation valve 50 and exhaust deactivation valve 51 are shown in their closed positions for deactivating the corresponding cylinder. If the engine is operated at a high power setting and all four cylinders are needed, these valves will be wide open (parallel to the flow) and generate negligible pressure drop in the flow. When a low engine power output is needed, these valves will be closed by servo actuators 52 and 53 (shown in FIG. 14). Simultaneously, fuel injection by injectors 47 for the deactivated cylinders will be discontinued.

The deactivated cylinders are isolated from the outside air, and after a few piston reciprocations, most of the air in the deactivated cylinders will escape though the piston ring end-gaps, generating a high vacuum state in these deactivated cylinders (mass of the air trapped in the cylinder is reduced substantially), which the closed and well sealing valves 50 and 51 maintain. Under these vacuum conditions, there is very little compression in these cylinders (the peak cylinder pressure when the pistons are at inner dead center is very low), so the friction loss due to piston ring loading and piston pressure loading has almost completely vanished; only inertia load remains, which is relatively low under low and medium speed operation (this is one of the main mechanisms that allows piston deactivation to improve part load efficiency). It needs to be mentioned that conventional four stroke piston deactivation is achieved by immobilizing the intake and exhaust valves, a mechanism far more complex than the one presented here. This approach for cylinder deactivation in two stroke engines can be applied to any type of two stroke engine, not just axial opposed piston units.

Figure 16:
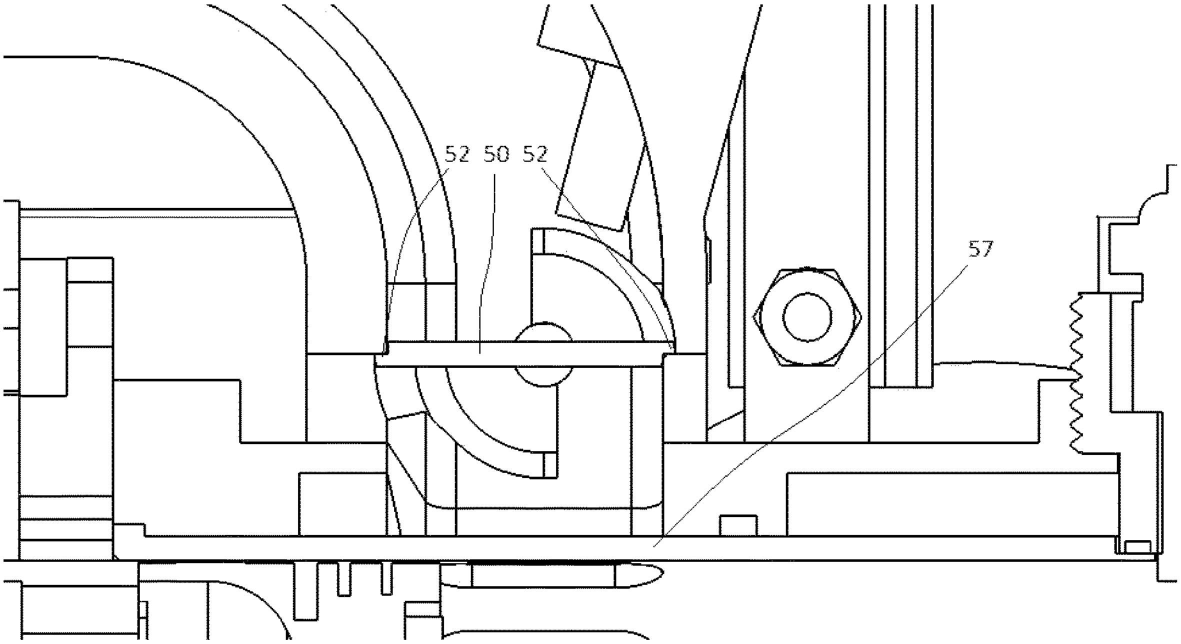
FIG. 16 shows the intake valve for the cylinder deactivation.

FIG. 16 is a close-up of FIG. 15 in proximity to the intake deactivation valve 50. The objective of this figure is to demonstrate one sealing method for the deactivation valves, which are shown in the closed position. The better the deactivation valve's seal, the higher the depression (vacuum) in the deactivated cylinder can be achieved when the pistons are close to outer dead center, and therefore the compression peak pressure at inner dead center will also be at a minimum. Therefore, the effectiveness of the deactivation in reducing friction of the deactivated cylinders, and therefore as a part load efficiency enhancement method, is maximized. This is particularly important in the intake side, where any leakage of compressed scavenge air past the closed intake deactivation valve 50 is direct energy loss via the extra work needed from the supercharger drive.

Figure 17A:
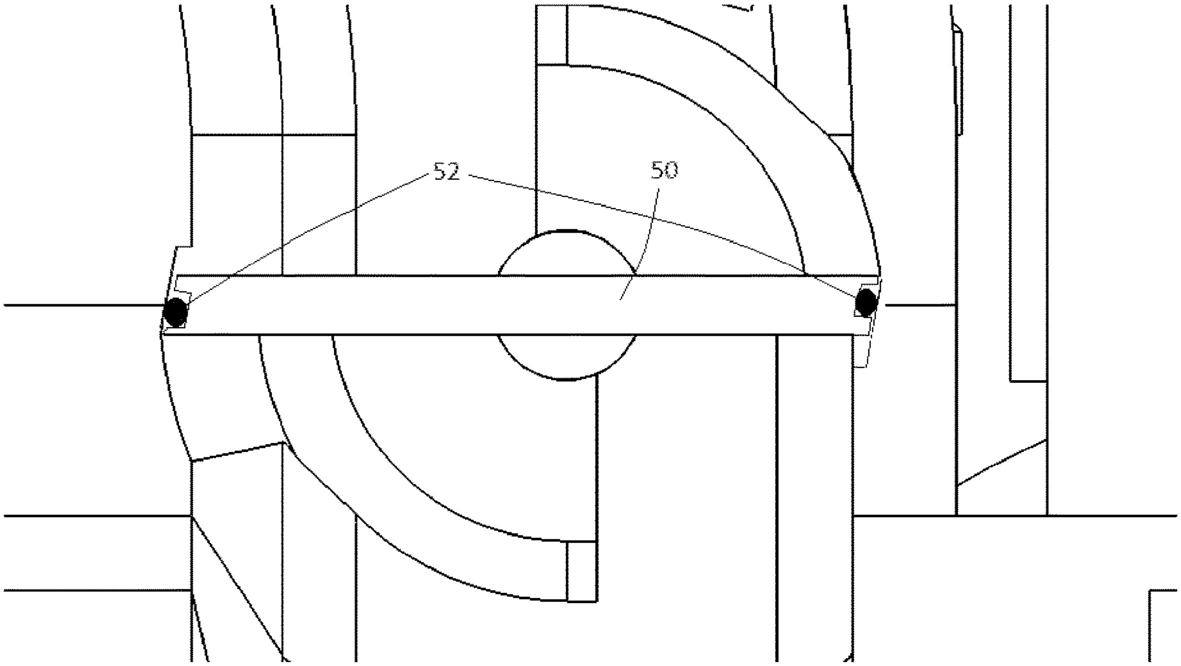
FIGS. 17A and 17B shows the exhaust valve cylinder deactivation.

In the case of FIG. 16, the sealing feature 52 is a tightly fitting step, which resembles a labyrinth seal. The sealing step 52 is formed all around the periphery of valve plate 50. However, a more elaborate and effective sealing method could be used, such as an O-ring. FIG. 17A shows a close-up of intake port valve 50 with an O-ring as the sealing feature 52 replacing the step of FIG. 16. Again, the O-ring and its groove is continuous throughout the periphery of valve plate 50. Similarly, effective valve sealing is desired for exhaust deactivation valve 51. Valve 51 is subject to exhaust heat and a polymer O-ring is not a reasonable option, especially given the need that the valve needs to be in proximity to the exhaust ports in order to minimize the mass of air trapped in the deactivated cylinder when both deactivation valves are shut. Therefore, the sealing feature 52 of the deactivation valve, which is in the form of an O-ring on FIG. 17A can be replaced by a compliant sheet metal sealing ring as shown in FIG. 17B.

Figure 17B:
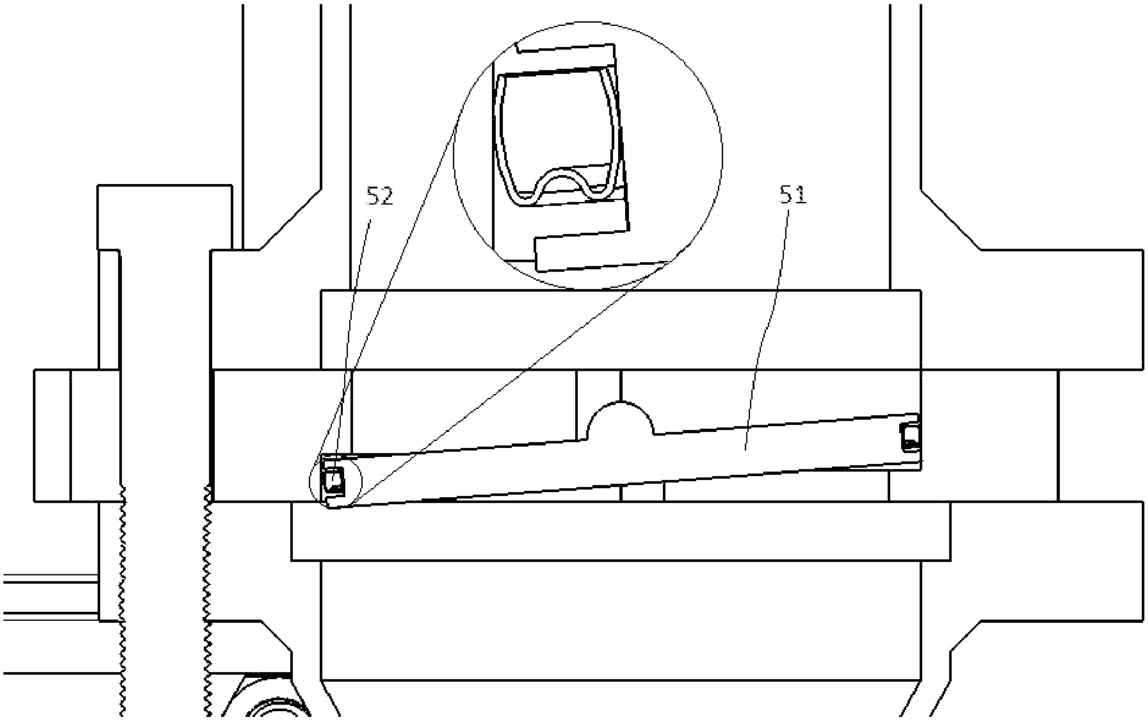

The sealing ring in FIG. 17B (the cross section of which is magnified for clarity in the middle of the figure) is called an "E-ring" in the field of static seals, and it is a sheet metal ring that is compliant in the radial direction. But other types of heat resistant secondary seals can be used to virtually close the gap between exhaust deactivation valve 51 and the surrounding surface of exhaust runner 9, which in turn will allow a maximization of the vacuum inside the deactivated cylinder, and therefore the minimization of the friction of the corresponding pistons.

Figure 18A:
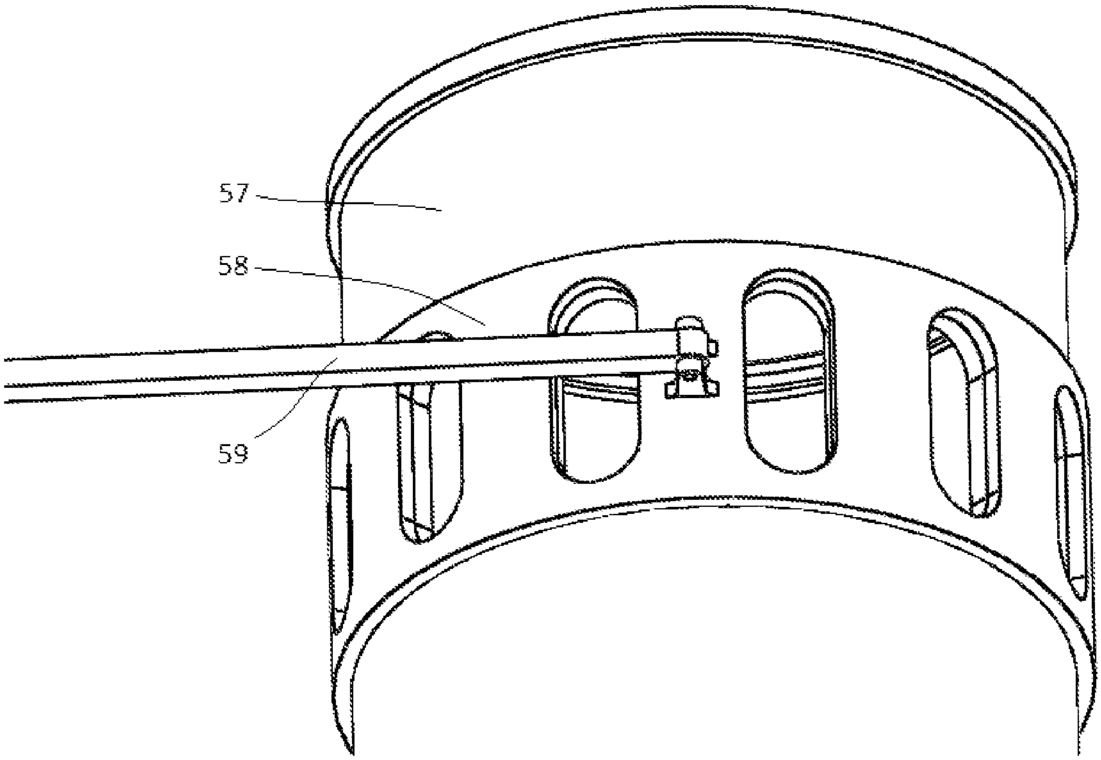
FIGS. 18A and 18B shows an alternate valve for cylinder deactivation.
Figure 18B:
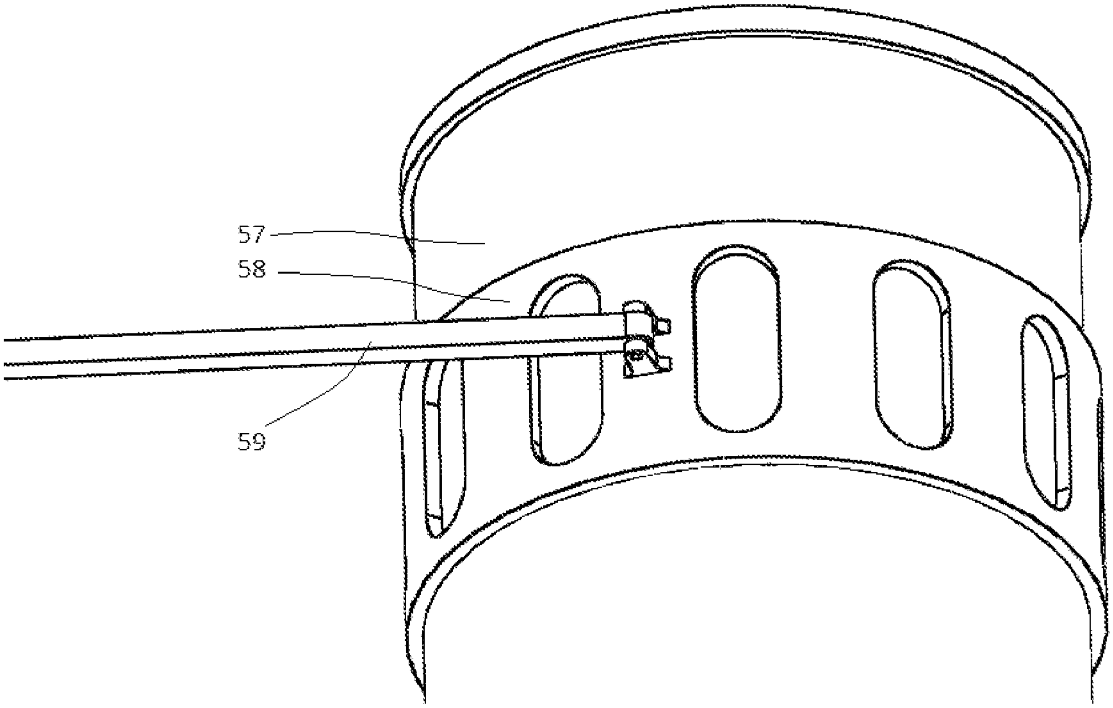

There is another alternative for deactivation valves. FIGS. 18A and 18B illustrate the design. The cylinder liner 57 (shown also in FIGS. 12 and 15), which is isolated from the rest of the engine in the figures for clarity, has intake ports 7 and exhaust ports 8 as shown in FIGS. 1 and 15. Outside the cylinder, surrounding the ports, there is an enclosed open space in order to allow the gasses (both intake and exhaust) to freely circulate around the cylinder on all ports and maximize scavenging efficiency. The radial width of this space is approximately equal to the width of each port in order to minimize flow restriction. This space offers the option to install a rotary sleeve valve instead of throttle valves 50 and 51.

In FIGS. 18A and 18B, deactivation sleeve valve 58 and deactivation control rod 59 are shown. The deactivation sleeve valve is a thin cylinder that fits tightly around cylinder liner 57 around the port area. The fit is tight enough to achieve a reasonable seal, but not so tight that the sleeve valve cannot rotate around the liner with relative ease. The sleeve valve 58 also has port cuts identical to the ones cut on the cylinder liner 57. The control rod 59 is connected to an actuator which can rotate the sleeve valve by a small amount. In FIG. 18A the angular orientation of the sleeve valve is such that the ports on the sleeve valve coincide with the ports on the cylinder liner. This orientation is for normal firing operation of the cylinders. When the cylinder needs to be deactivated, actuator controlled pushrod 59 rotates the sleeve valve slightly as shown in FIG. 18B (in this case by about 15 degrees, based on the number of ports) and the ports are completely blocked. One benefit of this method is that the port blockage happens much closer to the ports, so that the air that needs to be evacuated via the piston ring end gaps for near complete elimination of compression is smaller. Therefore, the friction minimization state will be reached in fewer cycles. This can be important for applications where the load on the engine is varied frequently.

When the two cylinders are deactivated, the demand on supercharger 48 is reduced. The reduction in the supercharger air flow, and therefore its power consumption, is achieved via a combination of methods. First, the supercharger driving system 54 (FIG. 14), which is composed of a system of pulleys and clutches, is activating a combination of clutches such as the gear ratio between the supercharger's 48 shaft and main shaft 1 is reduced (supercharger speed is reduced). Second, the main throttle body 55 is moved to a more closed setting, reducing the mass flow through the compressor. A third method available for reducing supercharger load is opening supercharger recirculation valve 56, which allows some of the high pressure air of the supercharger to return back into the inlet of the supercharger. These methods ensure that the supercharger parasitic loss is at a minimum when two of the four cylinders of the preferred embodiment four cylinder engine are deactivated or when the load on the engine is reduced. These methods can be applied to opposed piston axial engines with a different number of cylinders.

One of the features of the four cylinder opposed piston two stroke axial engine with deactivation for cylinders number two and four of FIG. 1 is that the exhaust system of the cylinders that deactivate is completely independent of the pair of cylinders that are not equipped with deactivating hardware. This is illustrated in FIG. 14 where the cylinder pair with no deactivating hardware exhaust pipe junction 53 is shown. A similar exhaust pipe junction exists for the cylinder pair equipped with deactivating hardware, which is under the engine and is not visible from the angle of FIG. 14. The two separate exhaust downpipes are clearly visible in FIG. 14. The reason why this is beneficial is that the exhaust deactivation valve 51 does not need to seal against the back pressure of another firing cylinder, nor will it have to seal against the pressure waves and heat of another firing cylinder.

Figure 19:
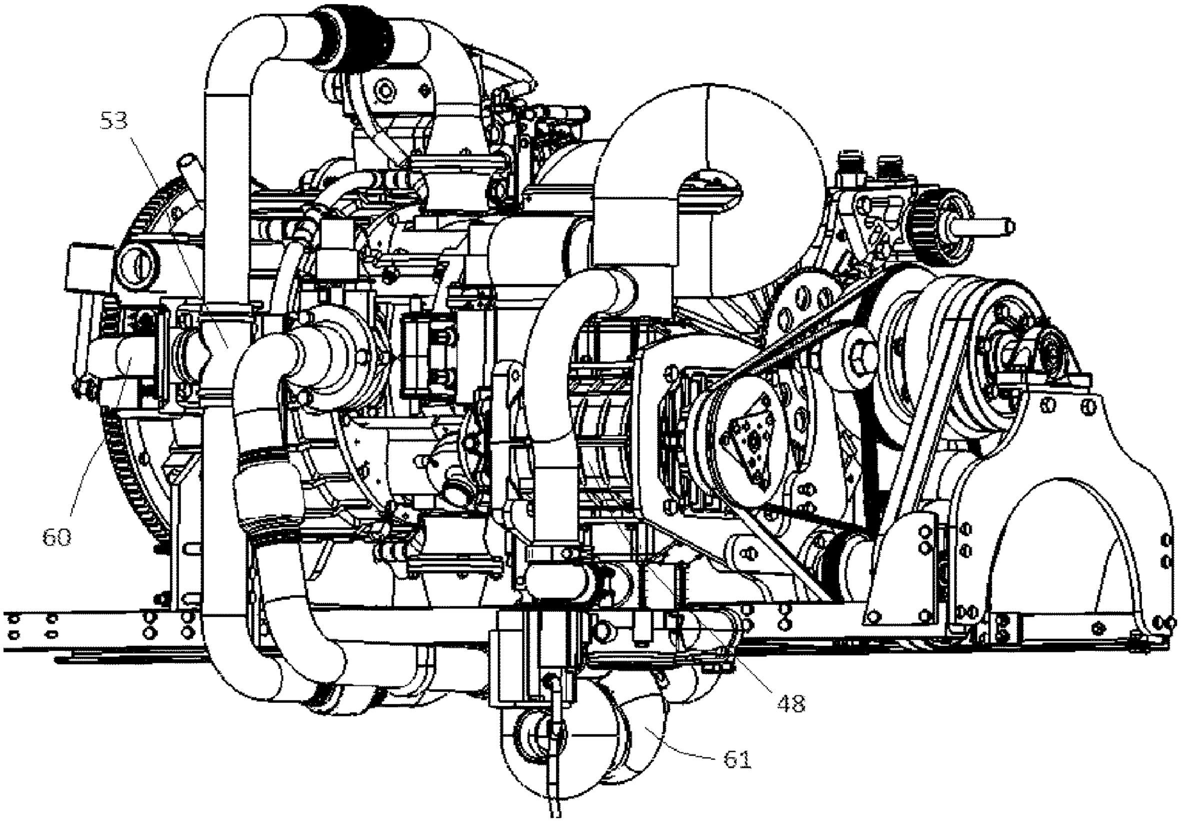
FIG. 19 shows the turbocharged embodiment of the opposed piston two stroke axial engine.

In another embodiment shown in FIG. 19, just downstream from each exhaust junction, a turbocharger turbine is installed, each turbine is energized by the exhaust gasses of the two corresponding cylinders. The turbocharger 60 has its turbine connected to the exhaust pipe junction 53, which is the junction of the cylinder pair with no deactivating hardware. Turbocharger 61 is energized by the cylinder pair equipped with deactivating hardware (FIG. 19 is at a slightly different angle from FIG. 14, in order to show the lower portions of the engine). The two turbochargers supplement the supercharger 48 to the task of compressing the intake air under high load conditions (the pipes that connect the turbocharger compressed air outlets to the supercharger inlet are not shown in order to avoid excess complexity of FIG.

19). The drive ratio between the main shaft 1 and supercharger 48 can again be adjusted via the mechanism 54 in order to optimize the supercharger speed for the turbocharger assist operation. The reduction in the supercharger parasitic power requirement improves the efficiency of the engine. If the requirement in engine load is reduced, the two cylinders and their corresponding turbocharger can be completely deactivated. The two remaining firing cylinders operate at high enough load to keep their turbocharger energized, which again allows the reduction of the supercharger parasitic power to be minimized.

Therefore, the supercharger power consumption is lower than the non-turbo version at similar operating conditions. Without the deactivation of two of the cylinders, there may have not been sufficient exhaust enthalpy to keep both turbochargers operating for certain operating conditions, and relying purely on the supercharger would reduce further the low load thermal efficiency. Of course, in the engine of FIG. 19, both pairs of cylinders could be equipped with deactivation hardware in order to spread the wear more evenly on all the components. The electronic control unit determines which pair of cylinders is deactivated.

It needs to be noted that the cylinder deactivation methods described in this document can be applied to any type of two stroke engine, even engines with conventional crankshafts. Uniflow scavenge engines, for example, where the intake takes place via piston ports, can have the ports blocked and unblocked with valves such as the ones shown in FIGS. 16 to 18, while the exhaust valves (which are usually conventional poppet valves) can be deactivated and left in the closed position via conventional methods that are already applied in the industry. Loop scavenge engines can have both intake and exhaust ports blocked and deactivated via identical methods.

Lenert in LU82321A1 is also describing an axial engine with potential for cylinder deactivation. The Lenert design can also be a two stroke or four stroke, according to the document, but it is not of the opposed piston configuration. Also, the method of deactivation is different from this invention. Instead of blocking the ports as is done in this invention, or immobilizing the valves, which is the common approach followed by the industry and tends to reduce the air mass trapped in the cylinder and therefore reduce compression pressure, Lenert is proposing to completely disabling the piston motion by active modifications done on the cam tracks that couple the piston reciprocation to the shaft rotation. The exact mechanical details of how these cam modifications are executed and how the deactivated pistons are forced to a sudden stop without violent bouncing and damage to the components has not been described in the referenced document, but nevertheless the deactivation methodology is different from the disclosed mechanism.

Another innovative feature of the opposed piston two stroke axial engine of FIG. 1 is the cooling configuration for the exhaust ports. The exhaust ports are the hottest parts of a two stroke engine, much like the exhaust valves are the hottest parts of a four stroke engine. The cylinder liner area between the ports is potentially the hottest part of the cylinder liner. Especially under high loads, the cylinder liner inner surface between the ports can become so hot that the oil film deposited on it by the piston rings could oxidize and deteriorate. Because the oil transported on the upper part of the stroke of the exhaust piston needs to pass through the exhaust port zone, the possibility exists that the lubricant on the inner part of the liner could be oxidized prior to reaching that area. Furthermore, very high temperature of these areas of the cylinder can also generate temperature distortions which can propagate to other portions of the cylinder liner, especially further towards the inner dead center where the compression rings are required to seal against the cylinder liner. Therefore, the need arises to cool this cylinder liner area between the exhaust ports.

Figure 20A:
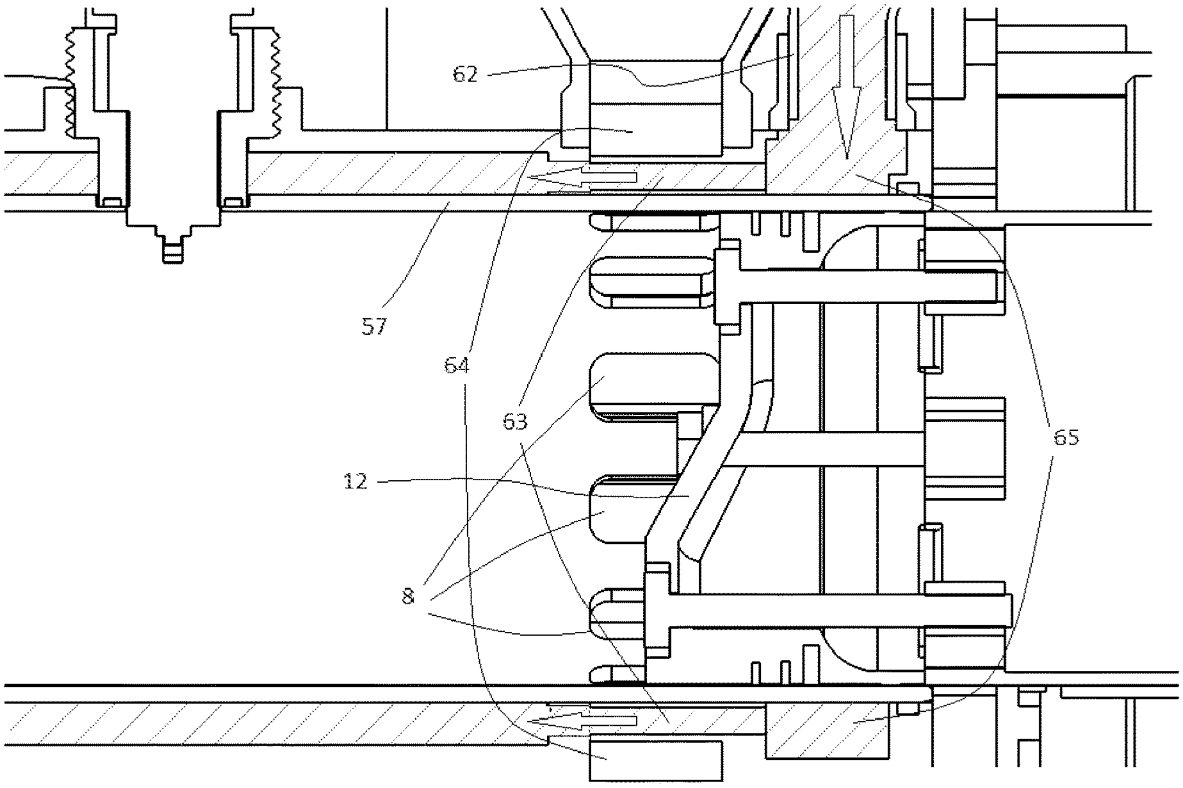
FIGS. 20A and 20B show details of the cooling system close to the exhaust ports.

FIG. 20A shows a cross section of the two stroke opposed piston axial engine along a plane that coincides with the engine axis as well as the cylinder axis. FIG. 20A is close to the exhaust ports, showing exhaust piston head 12 which happens to be close to its outer dead center. The hatched area of FIG. 20A is area occupied by coolant. Coolant enters the main engine from coolant entry pipe 62, and enters the coolant annular area 65 surrounding cylinder liner 57. The arrows in FIG. 20A depict the general direction of the coolant flow. The port-bridge coolant channels 63 (the number of which per cylinder is equal to the number of exhaust ports per cylinder) transfer the coolant across the exhaust port annular area 64 such that the area between exhaust ports is cooled. This is illustrated from a different angle by FIG. 20B, which is a cross section of the engine along a plane perpendicular to the axis of the cylinder. The cross sectional plane passes through exhaust ports 8 and is facing away from the inner dead center (which is at the left of FIG. 20A). The piston head 12, cylinder liner 57, and exhaust ports 8 are pointed out, in order for the reader to comprehend the orientation of the Figure.

Figure 20B:
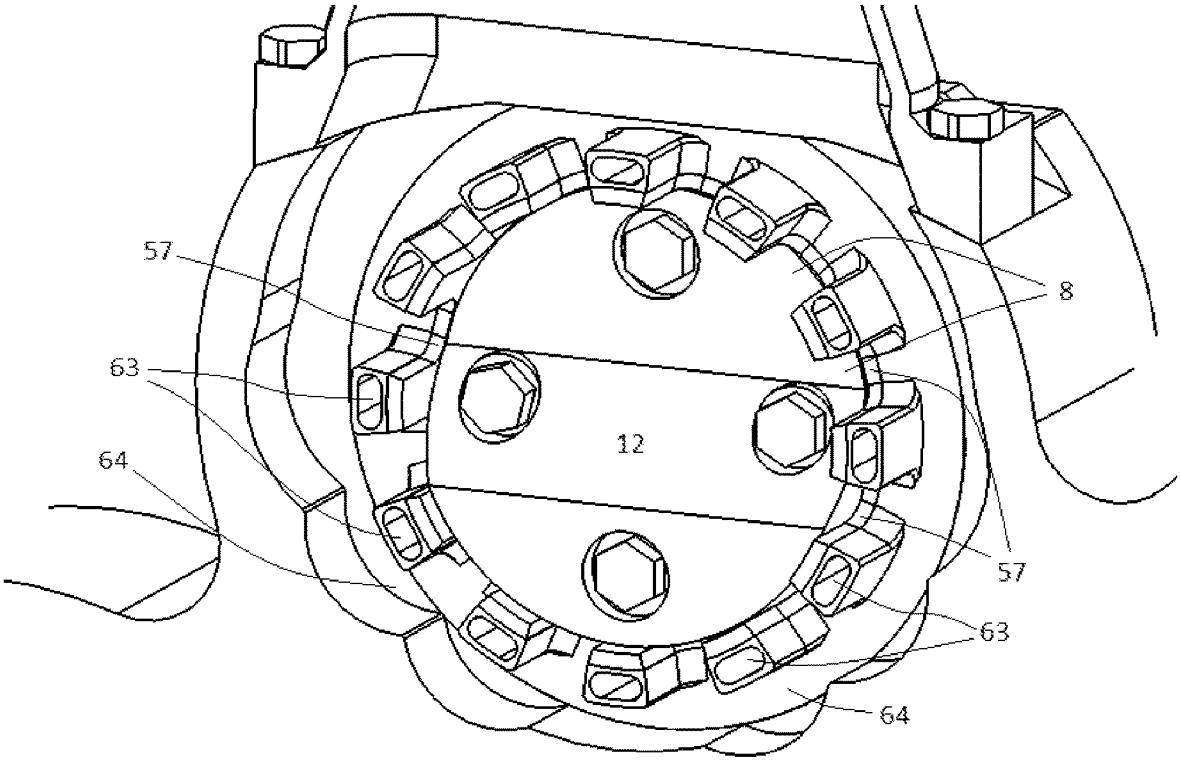

The purpose of the FIG. 20B is to point out the port-bridge coolant channels 63 from a different angle. The exhaust ports 8, the cylinder liner 57, the exhaust piston head 12, and annular exhaust space 64 are all visible and pointed out. The coolant channels 63 transfer coolant in proximity to the exhaust ports in order to maintain a reasonable temperature of the cylinder liner 57 between the ports so that the lubricant deposited on the inside surface will not oxidize. Also, the annular space 64 surrounding the exhaust ports 8 and outside of the coolant channels where the exhaust gasses are free to circulate and flow upwards towards the exhaust runner is clearly visible. In that space, an exhaust port deactivation valve such as the one shown in FIGS. 18A and 18B can be fitted, but fitting tightly outside of the part that contains coolant channels 63 rather than directly on the cylinder liner 57.

Figure 2:
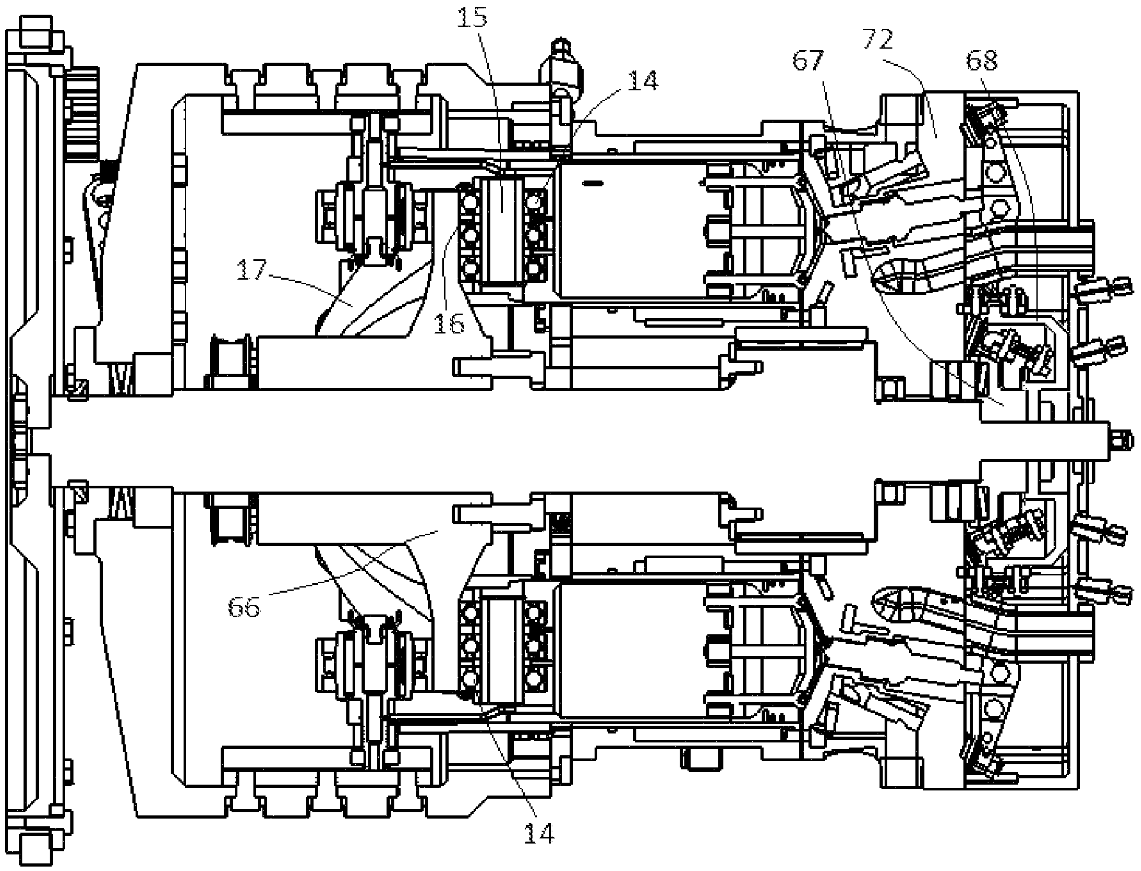
FIG. 2 shows the general features of the four stroke rocker exhaust valve actuation axial engine via a cross section from a central pane.
Figure 3:
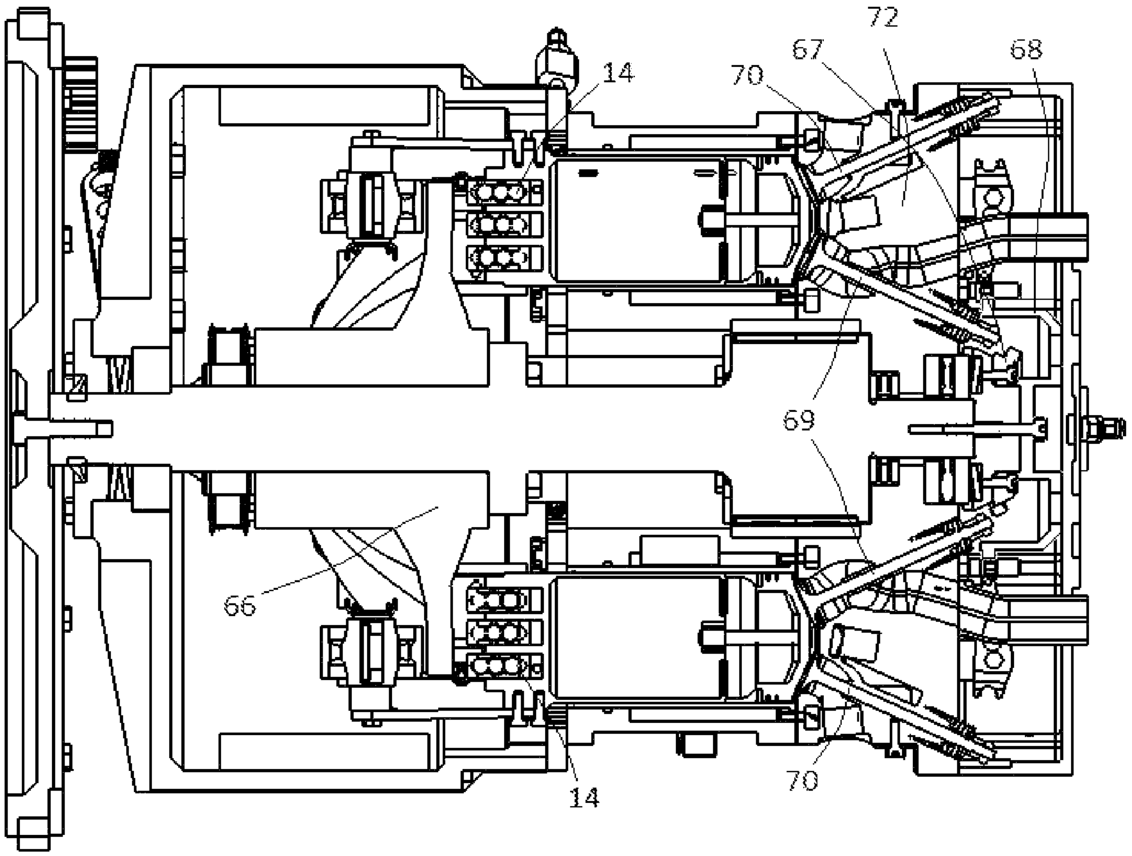
FIG. 3 shows the general features of the four stroke rocker exhaust valve actuation axial engine via a cross section from a plane slightly offset from the axis in order to reveal the two of the four valves per cylinder.
Figure 4:
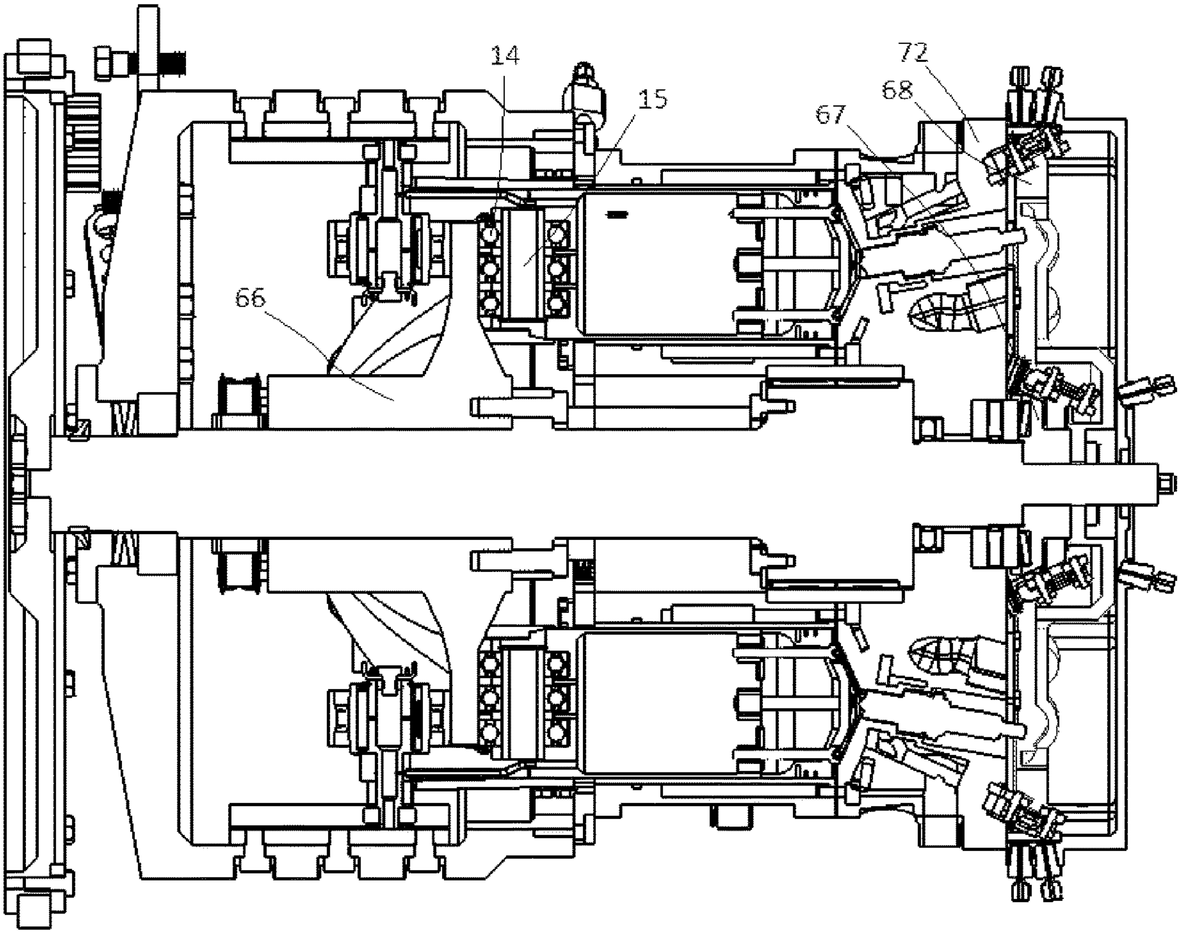
FIG. 4 shows the general features of the four stroke direct exhaust valve actuation axial engine via a cross section from a central pane.

In this section, a general description of the two four stroke preferred embodiments is disclosed, and comparison to the prior art is given. FIGS. 2 and 3 show the general characteristics of a four stroke axial piston engine. This particular engine is a four cylinder engine, but the design can be adopted for different number of cylinders. FIG. 4 shows the general characteristics of another embodiment of the four stroke axial engine, which differs mainly in the details of the valve actuation, which is described in detail further down in this document. The main difference between the two embodiments is the method of actuation of the exhaust valves. The two four stroke embodiments presented in this document share the novel piston assembly features of the opposed piston two stroke axial engine presented above. The shared features include the primary roller 14 and secondary roller 19 that couple the rotary motion to reciprocation, the piston side load features including the side load roller 29, anti-rotation roller 30, and piston lubricant distribution features including the oil delivery slider 36, piston oil delivery groove 35, etc. In other words, the piston assembly design of the two stroke engine has been carried over to the four stroke, with minor design changes necessary due to the different engine geometry.

Unlike the two stroke engine that could have one piston reciprocation per main shaft rotation (and indeed the embodiment shown in FIG. 1 has only one piston reciprocation per main shaft rotation), the four stroke versions need to have at least two piston reciprocations per shaft rotation. This is evident in the piston cam 66 in FIGS. 2-4, where two complete "waves" instead of one are shown. This of course leads to a piston cam profile with higher inclination (assuming the same piston stroke) and therefore higher piston assembly side load, but as discussed above, the side load is reacted out via anti-friction roller element bearings, so the increase in piston friction due to the increased side load caused by the increased cam inclination is negligible. FIGS. 2-4 also show the intake valve cam wheel 67 and exhaust valve cam wheel 68 that activate the intake valves 69 and exhaust valves 70 respectively (four stroke valve train) and have one cam profile (lobe) each (valves are visible only in FIG. 3, the details of the valve train operation are explained in more detail further down in the document).

This way, the four stroke cycle is satisfied, i.e., there is one intake, one compression, one expansion, and one exhaust event for every two piston reciprocations or one complete main shaft (and cam wheel) rotation. However, given again the piston side load provision, the piston cam 66 could have four waves, and the intake cam wheel 67 and exhaust cam wheel 68 could have two lobes each. This will be beneficial for applications where high torque at lower engine speeds is desired, avoiding the large and expensive gears associated with output shaft speed reduction.

Herrmann in a series of patents ranging from U.S. Pat. Nos. 2,224,817 to 2,224,822 describes a four stroke axial engine that shares some similarities to the four stroke engine embodiments described in this document. More specifically, a piston cam with two reciprocations per shaft rotation is disclosed, and valve cam wheels with one lobe for intake and one for exhaust is also disclosed, in order to satisfy the four stroke cycle. In this general description, the designs are identical. This series of patents by Herrmann gives a lot of design details, and this makes it possible to identify the novel features of the four stroke presented in this document. The novel feature that is the focus of this section of the document relates to the piston design. The piston assembly and piston roller design features of the opposed piston two stroke engine presented in FIGS. 6-13 are carried over to the four stroke. The main purpose of these features is to reduce piston friction, and distribute roller contact stresses over as large area as possible while minimizing roller sliding.

In contrast, the details of the design presented by Herrmann show that the side load from the inclination of the cam is reacted directly by the piston skirt on the cylinder wall, much like a conventional engine. This of course will be particularly detrimental in terms of friction and wear in the top dead center area, and specifically just after top dead center where the cylinder pressure is very high and the cam inclination starts to grow. During that part of the cycle, the piston speed is still too low for fluid film lubrication to form, and therefore the piston to cylinder liner friction will be high. This will be particularly detrimental if more aggressive piston cam profiles are applied for more piston reciprocations per main shaft rotation or more rapid piston motion close to top dead center, in order to fully exploit the freedom from the conventional crankshaft/connecting rod constrains. Interestingly, Herrmann recognized the need for piston anti-rotation features, much like Alfaro did in the opposed piston axial engine, but the anti-rotation feature proposed by Herrmann does not include any ant-friction bearings, it is simply a sliding flat plate fitting into a female groove.

Further differences between the Herrmann design and the proposed four stroke presented here in the area of the roller follower for the piston assemblies is that Herrmann did not make any attempt to reduce the sliding between the radially varying cam linear speed and the constant speed of the roller, as described above (as a reminder to the reader, in this document the option of three separate axially thin primary rollers or a conical roller has been proposed in order to minimize this relative sliding, or a conical tilted primary roller is used that nearly eliminates this relative sliding). Instead, a relatively crude single primary roller is used with no cam-roller sliding relief. In the Herrmann design, the only way to minimize this inefficient relative sliding is to design a narrow primary roller, but that will increase the contact stresses and reduce the life of the components. As a result, the proposed piston cam design is more efficient than the one proposed by Herrmann in coupling the piston reciprocating motion and shaft rotating motion.

Figure 21:
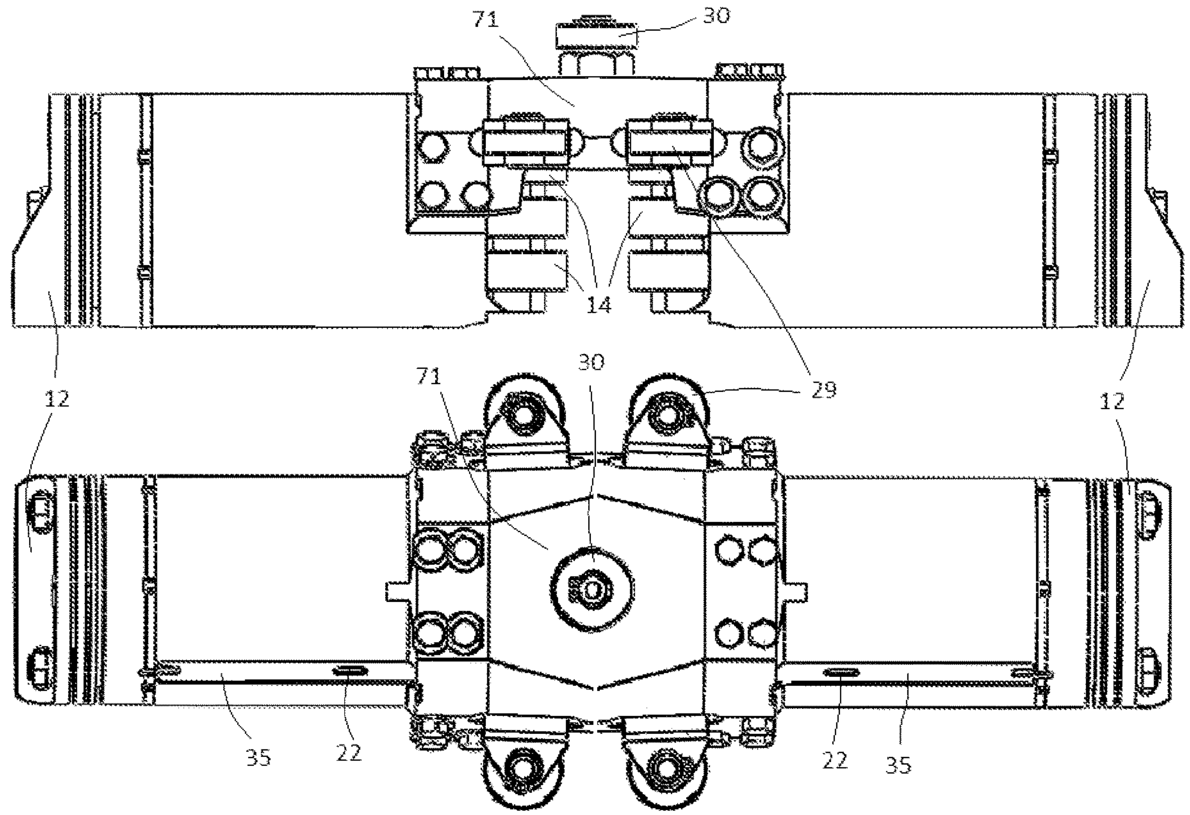
FIG. 21 shows a double ended piston for the eight cylinder four stroke axial engine embodiment.

The four stroke engine embodiments presented in FIGS. 2-4 are both four-cylinder engines with one cylinder head and single-sided pistons, i.e., there is only one piston head 12 for each piston assembly. If a larger engine is needed, a double-sided piston similar to the one described by Herrmann can be used, while the critical piston features described above are retained. This double sided piston assembly is illustrated in FIG. 21. With the exception of the secondary roller (which is now replaced by the primary roller of the mirrored piston), all the prior features are utilized. The secondary bracket 18 has been replaced or modified by a piston connection bracket 71. FIG. 21 shows the side rollers 29 (four in total instead of two per piston assembly), and anti-rotation roller 30 (only one is sufficient per piston assembly). The piston oil delivery grooves 35 and oil injection holes 22 are visible, for example, and their function is identical as before. Obviously, there is no need for secondary roller lubrication holes, pipes, and shafts. The remaining details of the eight cylinder engine can be imagined, where the cylinder head 72 of FIGS. 2-4 is duplicated on the opposite side of the engine, and so is the block and cylinder liners, while the double sided pistons of FIG. 21 are used. In other words, the eight cylinder engine embodiment is identical to the engine disclosed by Herrmann, but with the novel piston and roller sliding relief features presented above as well as the valve train features that are presented further down in this document. Obviously, different numbers of cylinders can also be specified, such as twelve or six per side.

Trimble in U.S. Pat. No. 4,090,478 also proposed a four stroke barrel engine that shares a lot of similarities with the one disclosed by Herrmann or the one disclosed in this document. The piston cams are replaced by two sinusoidal continuous grooves cut on a shaft sleeve. Two steel balls on each piston assembly engage these grooves and couple the piston motion to the shaft rotation. While this approach is very cost effective from the fabrication perspective, the contact stresses of transferring all the piston pressure and inertia loads via only two balls are very high because the area of contact is only two points. Nevertheless, the approach by Trimble is substantially different from the present design in other ways as well. It is however noteworthy that Trimble also recognized the need of a piston anti-rotation feature, which is formed by a straight groove on the engine housing, a straight matching groove on the piston assembly, and a steel ball that couples the two grooves. This approach is again simple, but the friction losses are higher than the roller element bearing in the form of anti-rotation roller 30 proposed in this document (seen in FIGS. 6, 7, 13, and 21). Trimble does not offer any special piston side load features and the piston side load is simply transferred to the piston skirt. Also, the intake and exhaust valves are configured in completely different way than in this disclosure.

Aswani in U.S. Pat. No. 6,779,494 also describes a four stroke barrel engine with identical general layout as the one described by Herrmann or this present invention. Again, a cam profile that rotates with the same shaft engages piston followers to couple the piston reciprocating motion to the shaft rotation. Again, two complete piston reciprocations for every complete main shaft rotation are specified, while the valve cam wheel has one lobe for the intake and one lobe for the exhaust, in order to specify the four stroke thermodynamic cycle. Aswani does not give design details of the engine that he is proposing. Instead, only a conceptual description is given. The main objective of the Aswani patent is to disclose cam profiles for the piston motion aimed at balancing the engine, and not about optimization with respect to the thermodynamic cycle. Nevertheless, Aswani recognizes the benefit to react the piston side load with a linear bearing in the "less hostile" environment outside the cylinder and piston skirt interface, which is a high-level description of the piston side load reaction provision with roller element bearings described in this document. Unlike this document, however, Aswani did not describe any design details of the type of linear bearing he was proposing.

In this section, the detail description of the valve activation of the four stroke axial engine is described. The intake valve design is identical to the two four stroke versions disclosed, and in this section the common intake system is described. The exhaust valve actuation differs, however. In this embodiment, the exhaust valve is directly activated by the exhaust cam wheel. The valvetrain design of this embodiment is also contrasted to the ones disclosed in the prior art.

Figure 22A:
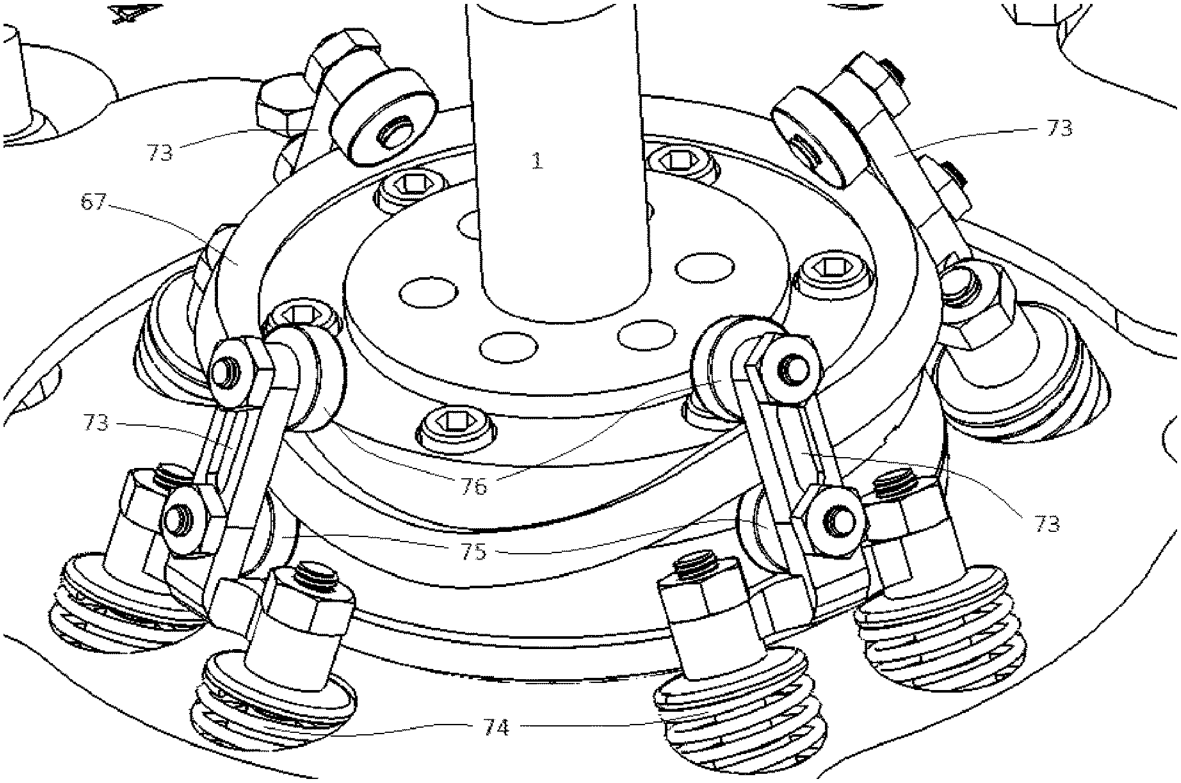
FIGS. 22A and 22B show details of the intake valve and intake valve actuation for the four stroke axial engine embodiment.

Unlike the four stroke axial engines described in the literature, the proposed engine has four valves per cylinder (rather than two), two intake valves and two exhaust valves. The advantage of four valves per cylinder are well understood by those skilled in the art of internal combustion engine design. Also, the cam followers are of the roller type instead of the flat tappet type. FIG. 22A shows the valve train end of the engine, which is on the right hand side of FIG. 4. The exhaust cam wheel 68 (visible on the right-hand side of FIG. 4) has been removed in order to clearly reveal the intake cam wheel 67 which is directly bolted on the main shaft 1. The intake cam wheel 67 is visible, which has only one lobe in this embodiment (as discussed above, the piston cam 66 has two waves for two piston reciprocations per main shaft 1 rotation in order to fulfill the four-stroke cycle). Because the cylinder head design follows the pint-roof approach, the valves are tilted (see FIG. 3, which is a different embodiment four stroke, but the valve tilt feature is shared with this embodiment). This valve tilt requires that the cam wheel 67 has its active surfaces similarly tilted in order to engage the rollers at right angles.

The two intake valves are connected by intake valve bridge 73. This connection is evident in FIG. 22B, which is a cross section of the engine along a plane that passes through the two axes of the two intake valves 69. The valve stems of the intake valves 69 are threaded and nuts engage these threads and secure the valve stems on valve bridge 73. These nuts also secure the valve spring washer and valve springs 74. There are two rollers for each valve bridge (the rollers are roller element bearings). Roller 75 opens the valves and roller 76 closes the valves. It can be noted that in the presence of valve spring 74, the roller 76 maybe redundant, but in this embodiment, the valve spring is not stiff enough to return the valve to the closed position at high engine speed and follow the very rapid closing event of intake cam wheel 67. The designers have taken advantage of this cam wheel geometry (which is not possible with conventional camshafts) and have designed a valve train system that actively closes as well as opens the valves and therefore can have a much more rapid opening and closing valve event, without relying on a high strength valve springs to close the valves. The lack of stiff valve springs means that the load on the valve train is low, except during the valve opening and closing event.

Also, the reliability of the valvetrain is improved because a broken valve spring will not lead to a valve and piston collision. The valve spring 74 is in this case used only to provide a pre-load on the valve and to hold it closed until gas pressure is built up by compression. It can be noted, however, that in another embodiment, a stiffer valve spring 74 can be used and the closing roller 76 is eliminated.

Figure 22B:
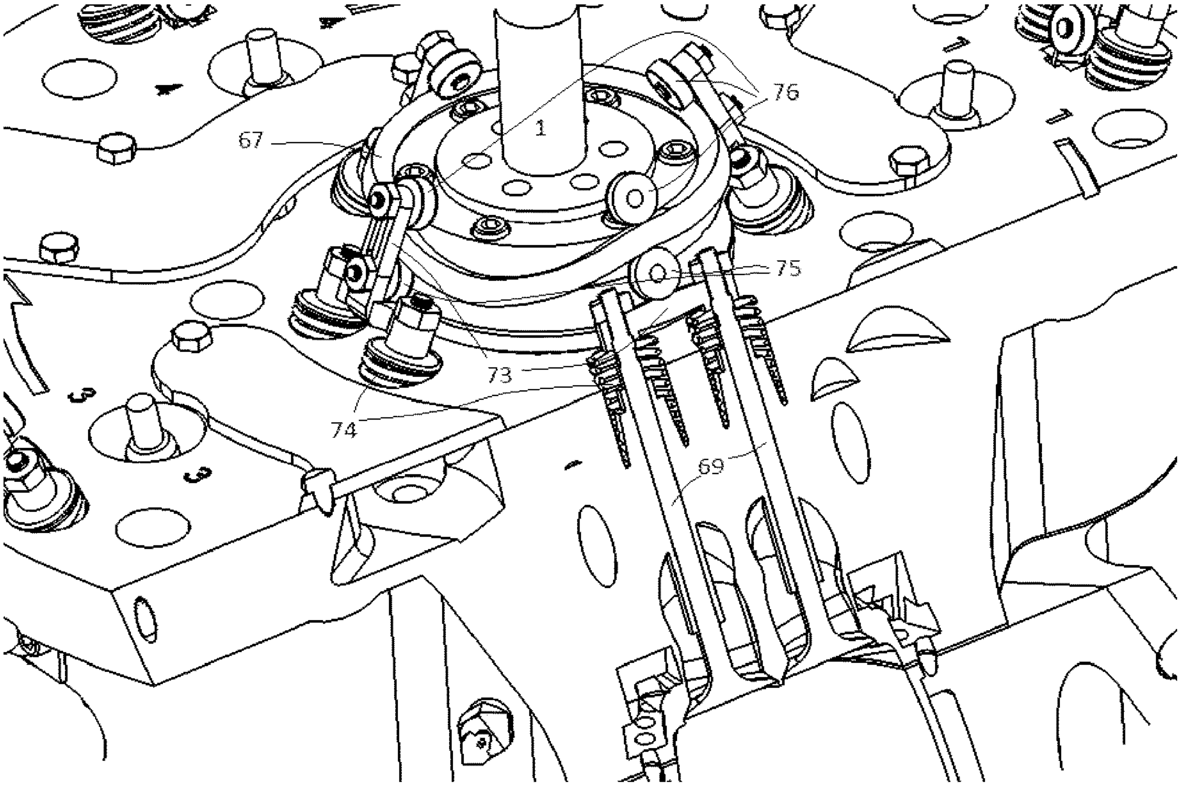
Figure 23:
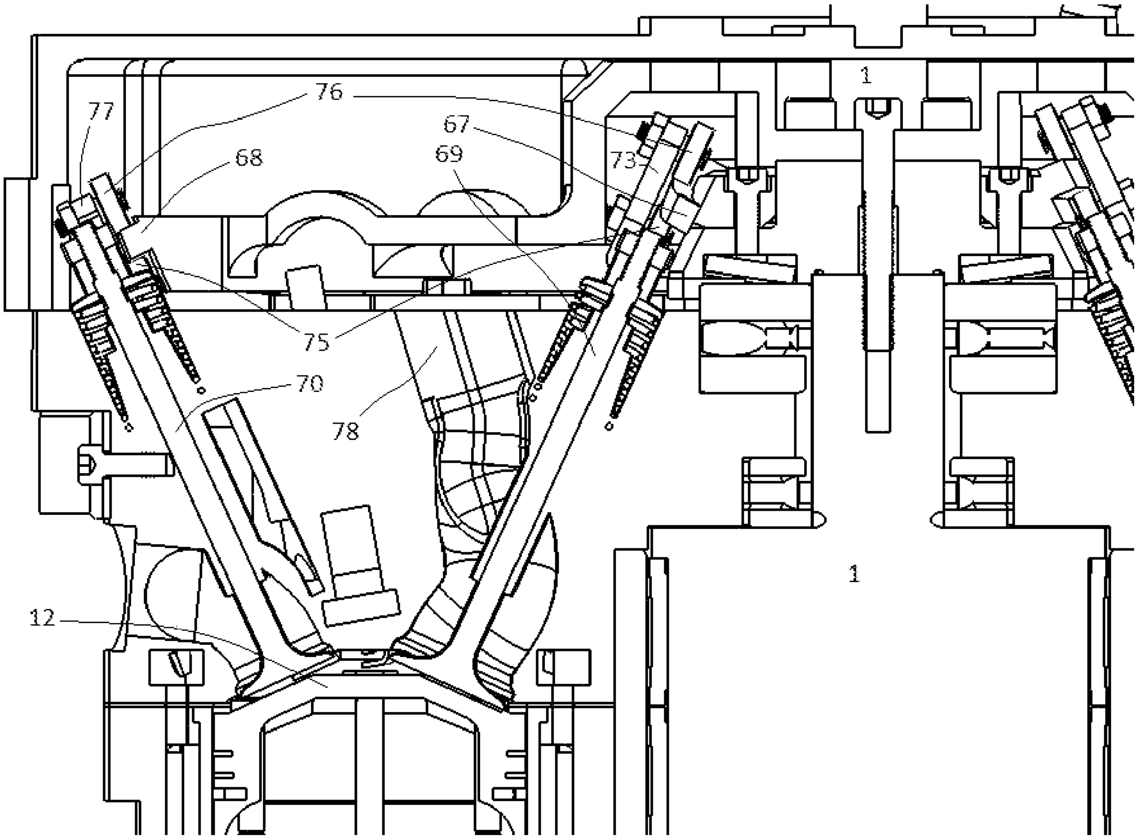
FIG. 23 shows a cross section of the four stroke direct exhaust valve actuation engine embodiment along a plane that passes through the axis of the intake and exhaust valves, showing the pint roof combustion chamber, the intake and exhaust ports, and the tilt of the valves.

FIG. 23 shows a cross section of the four stroke engine along a plane that coincides with the axis of the exhaust and intake valve, which happen to be on the same plane on this embodiment. Obviously, the cross section plane is not coinciding with the axis of the cylinder nor the axis of the engine. The intake valve 69 and exhaust valve 70 are clearly visible. At the instant shown, the intake valve is just opening, while the exhaust valve is in the process of closing. The valve tilt, consistent with the "pint roof" combustion chamber architecture, is evident. The intake cam wheel 67 is also visible in the picture, as well as much of the hardware for the intake valve actuation that were presented in FIGS. 22A and 22B. However, the exhaust cam wheel 68 that was removed in FIGS. 22A and 22B is now shown. The exhaust valve actuation is similar to the intake shown in FIGS. 22A and 22B. The reader is encouraged to notice the tilt of the valve, and the corresponding tilt of the active surfaces of the exhaust cam wheel 68. Similarly, an exhaust valve bridge 77 (which is partly obscured) connects the two exhaust valves, and also supports the valve opening roller 75 and closing valve roller 76.

As it can be seen in FIGS. 22 and 23, the intake cam wheel 67 and exhaust cam wheel 68 are solidly bolted on main shaft 1. In a different embodiment, however, the two cam wheels can be equipped with cam phaser devices which can alter the relative angular orientation of the two cam wheels with respect to the main shaft 1. This will allow a variable valve timing function, similar to typical modern automotive engines. This feature will be beneficial for engines that need to operate in a wide range of engine speeds.

Figure 24:
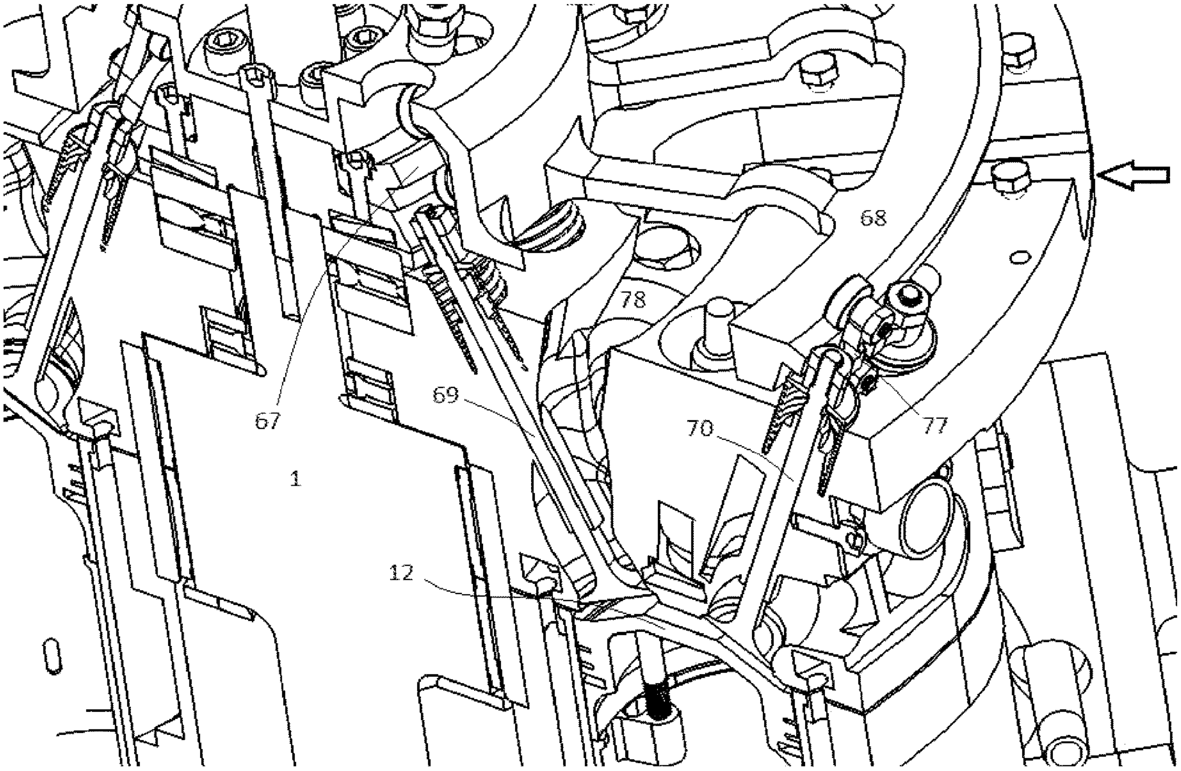
FIG. 24 shows a cross section of the four stroke direct exhaust valve actuation engine embodiment along the same plane as in FIG. 23, but from a different perspective.

The direct acting exhaust valve activation is the ideal design with respect to minimizing valve train inertia. However, as applied to a four stroke axial engine with four valves per cylinder and a pint roof combustion chamber design, there is a potential drawback that could affect certain applications, especially when high engine speeds are necessary. The location and orientation of intake port 78 is shown in FIG. 23. The least restrictive design of an intake runner that would have the lowest restriction for high speeds would be close to a straight up direction based on the perspective of FIG. 23. That, however, would interfere with exhaust cam wheel 68. In order to avoid interference with the exhaust cam wheel 68 for this direct valve actuation embodiment, the intake port is designed as shown in FIG. 24. FIG. 24 shows a cross section of the engine at the same plane as FIG. 23, but shows the engine from a different angle and the focusing on opposite cylinder. All the major components identified in FIG. 22 are identified in FIG. 23. For example, the exhaust valve 70, the exhaust valve bridge 77, the exhaust cam wheel 68, etc. In FIG. 24, the valve cover has been removed, and it is illustrated that the exhaust cam wheel 68 would interfere with a potentially straight exhaust port 78. Instead, the intake port has been configured in the cylinder head in such a way as to avoid that interference, but force the air intake through relatively tight bends. The air flow inlet is shown with an arrow on the top right of the picture, when the intake runner is connected. As seen by the reader, the intake port is having a number of bends, which will not affect the engine operation in medium speeds, especially with forced induction, but could generate a pressure drop if very high speeds are desired.

Therefore, for a very high speed application of the four stroke axial engine, an additional embodiment is disclosed, one where the exhaust valve mechanism is designed in a way that allows a direct and nearly straight intake port. This is described in the next embodiment.

The prior art of valve train design includes some of the features of this embodiment but not all. Referring to the series of patents by Hermann from U.S. Pat. Nos. 2,224,817 to 2,224,822, intake and exhaust cam wheels similar to the ones proposed in this embodiment are present. The first obvious difference is that Herrmann is proposing one intake valve and one exhaust valve per cylinder as opposed to two intake and two exhaust valves per cylinder in this document. The intake and exhaust valves are shown mostly parallel to each other, on what appears to be a wedge-type combustion chamber. In this proposed embodiment, four valves per cylinder are proposed, with a pint roof combustion chamber design.

The advantages of the proposed design with four valves per cylinder over Hermann's with two in terms of volumetric efficiency and combustion efficiency are well known. Furthermore, Hermann's valve train design, proposes flat tappet followers rather than roller followers. In Hermann's design, conventional valve springs are relied upon to close the valves and maintain contact between the follower and the cam wheel. In contrast, the embodiment presented here uses two cam surfaces and two roller followers per pair of valves in order to close the valves and does not rely on a high strength valve springs (the valve springs shown are optional, and are needed only to generate a pre-load on the valves). Therefore, Hermann's proposed engine cannot enjoy the rapid opening and closing of the valves compared to the proposed embodiment.

The only other patent document that a comparison is worthwhile is U.S. Pat. No. 6,779,494 by Aswani. Aswani recognized the benefit of using roller followers to engage the cam wheel lobes, but is also proposing two valves per cylinder only (one intake and one exhaust) and also relies purely on the valve springs to close the valves. Aswani offers very little design details on the valve train design for further comparison.

Figure 25:
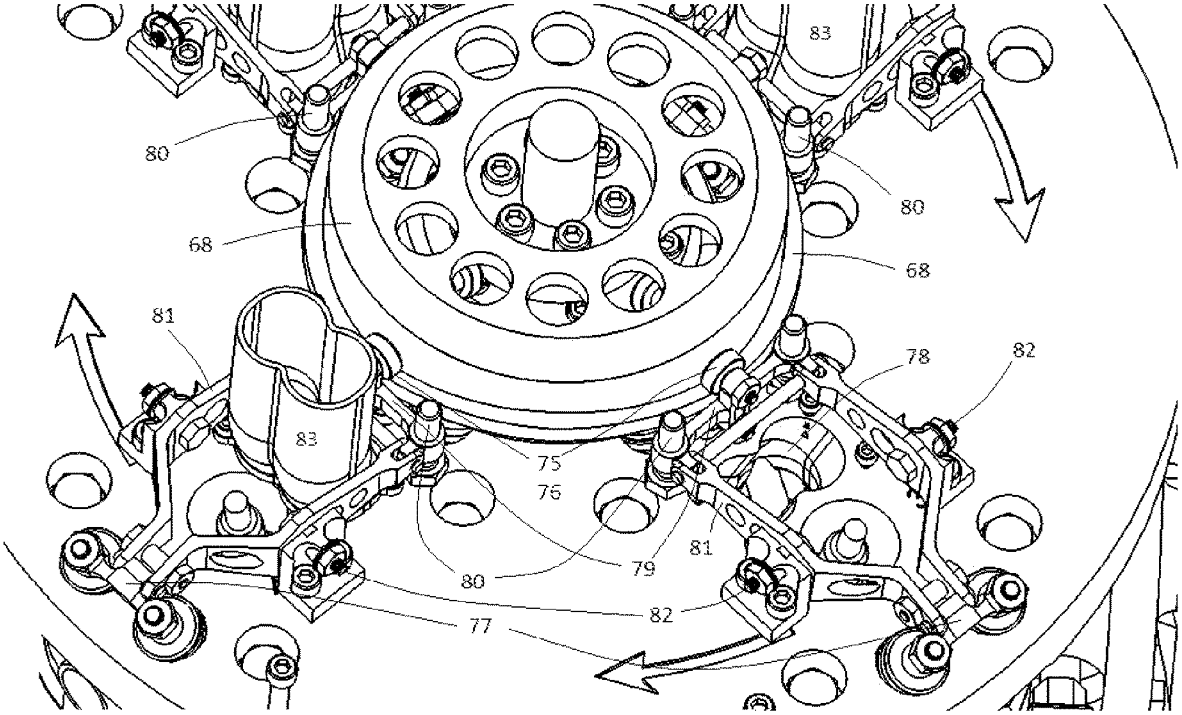
FIG. 25 shows the general arrangement of the valve train of the rocker arm exhaust valve actuation four stroke axial engine embodiment.
Figure 26A:
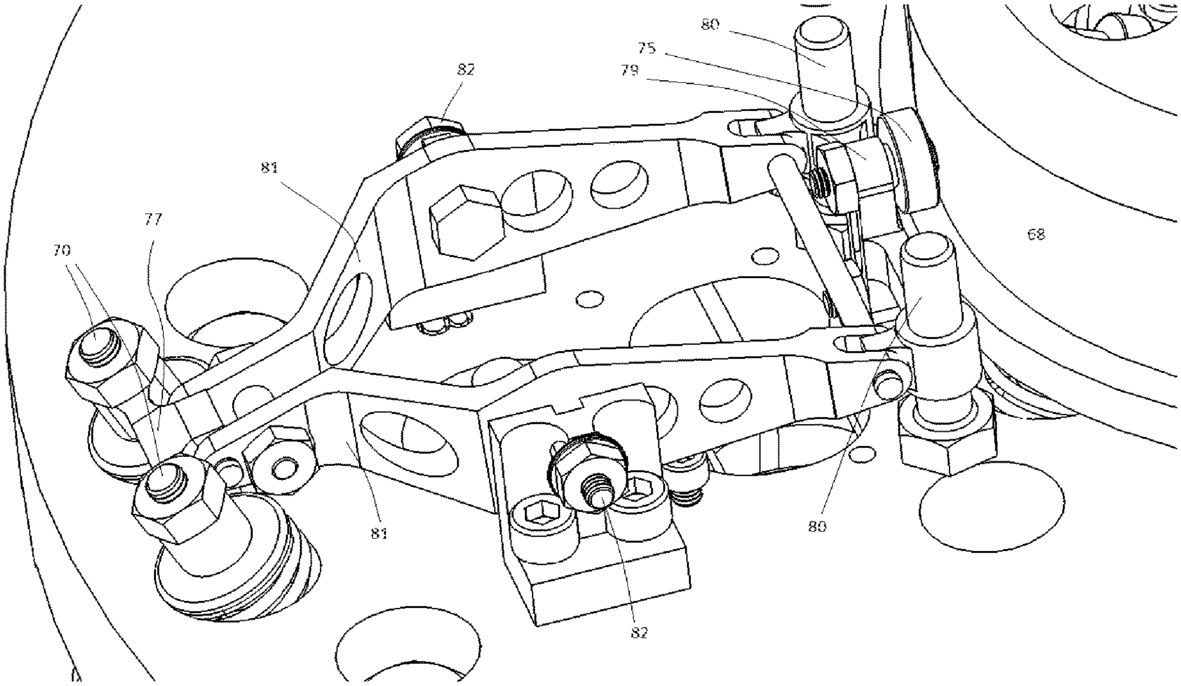
FIGS. 26A and 26B shows details of the rocker arm exhaust valve actuation of the rocker arm exhaust valve actuation four stroke axial engine embodiment.
Figure 26B:
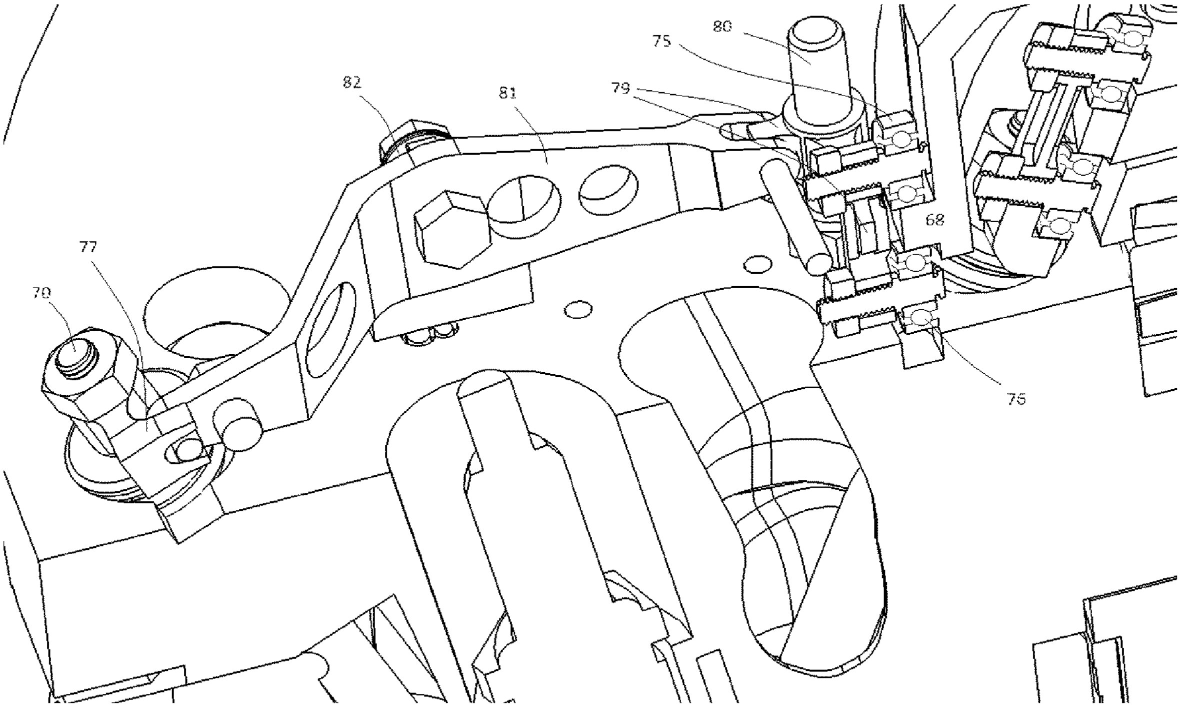

In this section, the rocker arm exhaust valve actuation embodiment of the four stroke axial engine is described. Referring to FIGS. 2 and 3, the exhaust cam wheel 68 is now much smaller in diameter compared to the one on FIG. 4. Referring to FIGS. 25, 26A, and 26B, which show the area of the valve train of the four stroke engine of FIGS. 2 and 3, the exhaust wheel 68 is now engaging directly the exhaust valve follower 79 instead of the exhaust valve bridge 77. The exhaust valve follower 79 is free to slide on two guide rods 80 which are solidly installed on the cylinder head. In other words, the exhaust wheel follower 78 is free to slide much like the valve bridge slides using the valve stems as guide rods (of course, the valve stems are movable, whereas the guide rods 80 are fixed on the cylinder head). The guide rods 80 do not need to be parallel to the exhaust valve stems, and in fact in this case, they are parallel to the engine main shaft. Each of the exhaust wheel followers 78 engages a rocker assembly 81 which pivots around exhaust rocker pivot 82. The cam lobe of cam wheel 68 is now in the opposite direction of the one shown in FIGS. 23 and 24, the exhaust valves open when the exhaust cam follower 79 is raised (based on the perspective of the figures), which in turn forces the exhaust valve bridge 77 to move down and open via the rocker assembly 81. The rocker assembly 81 has two legs and it surrounds intake port 78.

This allows the intake runner 83 to pass through the two legs of the rocker assembly 81, and allow a direct flow of the intake charge without the necessary sharp bends of the direct action exhaust valve activation embodiment described above (note that the intake runner 83 for the cylinder on the lower right of FIG. 25 has been removed in order to show the intake port 78 and rocker arm assembly 81). As mentioned above, this allows a less restrictive intake flow, which is particularly useful for high speed naturally aspirated engines.

Figure 26C:
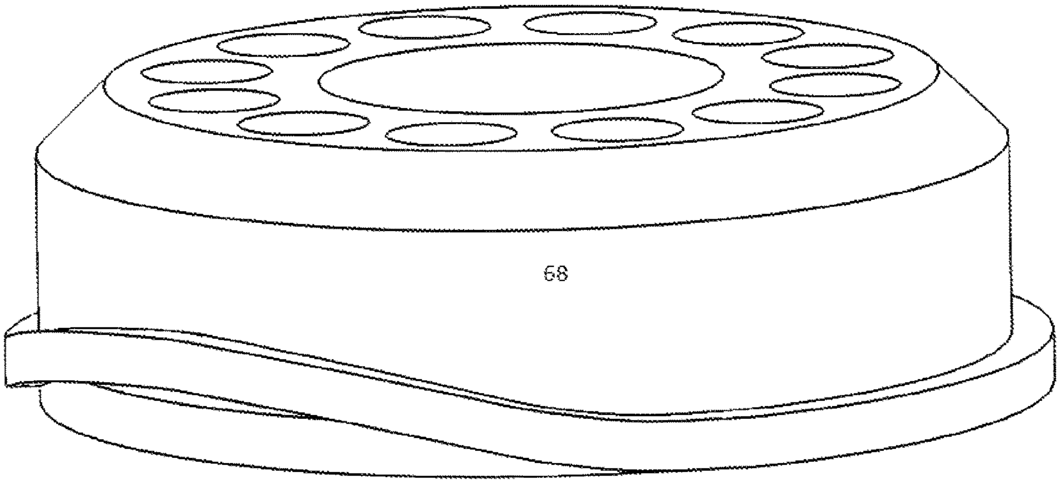
FIG. 26C shows the smaller diameter exhaust cam wheel of the rocker arm exhaust valve actuation four stroke axial engine embodiment.

FIGS. 26A and 26B show in more detail how the rocker exhaust activation works in the rocker activated exhaust valve embodiment. It can be seen that the opening roller 75 is now above the cam wheel 68 while the closing roller 76 is below. The reason for this, as explained above, is that the rocker arm mechanism has reversed the direction of the cam lobe on wheel 68, which is not very clear in the Figures due to the perspective. The cam lobe however on the exhaust wheel 68 is clearly visible in FIG. 26C. It is clear in this picture that the cam lobe is deflecting the exhaust cam follower 79 upwards when the valve is opening as opposed to downwards in the direct action embodiment.

The prior art does not contain a design combination similar to the rocker activation exhaust valve four stroke axial engine. In the case of Hermann, the geometrical problem that the rocker arm exhaust valve activation resolves, namely of the interference of a direct intake runner with the exhaust cam wheel as described in the direct exhaust valve activation, is not an issue due to the combustion chamber design that Hermann is using. As discussed further up in this document, Hermann's design is a two valve per cylinder, where the intake and exhaust valve are parallel to each other. Both of the valves are inclined towards the outside of the engine, allowing for relatively direct intake and exhaust ports and runners to exit the cylindrical boundary of the barrel shaped axial engine. However, this design also generates the significant disadvantage of using a two valve per cylinder wedge combustion chamber, which as discussed above is considerably inferior to the pint roof combustion chamber design proposed in this document. However, in a pint roof design combustion chamber with four valves per cylinder, the intake valves are inclined in the opposite direction from the exhaust, namely inwards (note, the designer could reverse the position of the intake and exhaust valves, but the same straightness issue would arise with exhaust runners, plus that design approach would radiate a lot of heat in the center of the engine, which is undesirable). This inclination compels the intake port to be directed more or less parallel to the axis of the engine, if the engine is optimized for high speed operation, and especially without forced induction. This less restrictive intake runner would then interfere with the exhaust cam wheel if a direct exhaust valve activation design is used, and this is exactly the problem that the rocker exhaust activation is resolving. In summary, when an advanced pint roof combustion chamber design where the intake valves are tilted inwards is utilized, such as in this disclosure will, the rocker exhaust activation design becomes useful.

The design presented in U.S. Pat. No. 6,779,494 by Aswani is also describing a two valve per cylinder engine, and given the very limited detail in the presented design, the issue of intake port design and the possible interference of the intake runner with the cam wheels is not recognized and not discussed.

It also needs to be mentioned that the rocker arm exhaust activation for a four stroke axial engine can have value in a two valve per cylinder hemispherical combustion chamber engine. In a hemispherical combustion engine, the intake and exhaust valves are tilted in a similar fashion as in the pint roof design disclosed in detail above. For certain applications, the cost of a pint roof design maybe prohibitively high, and instead a lower cost two valve per cylinder combustion chamber maybe preferable. In that case, it is well known that a hemispherical combustion chamber is still more advantageous in terms of volumetric efficiency and combustion efficiency than the regular wedge combustion chamber used by Hermann (parallel intake and exhaust valve). If such a design is selected, then the single intake valve replaces the pair of smaller intake valves shown in the above embodiment. In that case, especially if the engine in question operates at high speeds without forced induction, a similar need arises for a relatively straight intake port runner (no sharp bends in the airflow direction). That port runner will have to also be directed more or less parallel to the axis of the engine, and therefore potentially interfering with the large diameter exhaust cam wheel that the direct exhaust valve actuation would require. Therefore, the design approach of rocker arm exhaust valve activation with a smaller diameter exhaust cam wheel (which allows space for the intake runner) is also useful. Even though drawings are not shown for the hemispherical combustion chamber embodiment, a person skilled in the art will recognize the value of the rocker exhaust actuation applied on a hemispherical combustion four stoke axial engine in order to allow for a relatively straight intake runner.

In another design approach for the hemispherical combustion chamber design, the location of the intake valves and exhaust valves can be swapped. In this case, the rocker valve activation will apply to the intake valves. However, as discussed above for the four valve per cylinder embodiment, the downside of this approach will be that the exhaust ports and runners will be on the inside of the engine instead of the outside, and therefore there will be a lot of heat radiated to the inside of the engine.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the below claims.

What is claimed is:

1. An opposed piston two stroke axial engine wherein a piston assembly engages a cam with a plurality of primary rollers in order to spread contact loads and reduce roller to cam slippage, a plurality of provisions to react out piston side loads with a plurality of roller element bearings, and a piston anti-rotation feature using the plurality of roller element bearings, wherein the opposed piston two stroke axial engine has a piston cavity and a sliding oil supply tube to supply oil to the plurality of primary rollers.

2. The opposed piston two stroke axial engine of claim 1 further comprising a conical secondary roller to reduce contact stresses and bracket bending stresses.

3. The opposed piston two stroke axial engine of claim 2, wherein the conical secondary roller has a thin flange section that adds compliance and reduces the contact stresses.

4. The opposed piston two stroke axial engine of claim 1 further comprising cooling on an exhaust port bridge.

5. The opposed piston two stroke axial engine of claim 1 further comprising a number of cylinders separated into a plurality of groups wherein each group of the groups has exhaust pipes interconnected.

6. The opposed piston two stroke axial engine of claim 5 wherein combined exhaust flow energizes a turbine of a turbocharger, wherein the turbocharger contributes to a provision of compressed air for an intake of the opposed piston two stroke axial engine.

7. The opposed piston two stroke axial engine of claim 5 wherein combined exhaust flow energizes a turbine of a turbocharger, wherein the turbocharger provides compressed air for an intake of the opposed piston two stroke axial engine, where an even number of cylinders of each of the groups are configured to be deactivated together.

8. The opposed piston two stroke axial engine of claim 7 wherein all cylinders of each of three groups are configured be deactivated together.

9. An opposed piston two stroke axial engine wherein a piston assembly engages a cam with a plurality of primary rollers in order to spread contact loads and reduce roller to cam slippage, a plurality of provisions to react out piston side loads with a plurality of roller element bearings, the opposed piston two stroke axial engine having a sliding oil supply and annular groove, the opposed piston two stroke axial engine having a liner piston skirt and a plurality of rings wherein oil is suppliable from the sliding oil supply to the liner piston skirt and the plurality of rings.

10. The opposed piston two stroke axial engine of claim 9, wherein the annular groove has a plurality of interruptions to prevent ring end gap entrapment during piston installation.

11. The opposed piston two stroke axial engine of claim 9, further comprising two of the roller element bearings that are configured to allow the primary rollers to rotate with minimal slippage and friction as the plurality of primary rollers rides on cam surfaces, wherein the primary rollers have a conical shape.

12. The opposed piston two stroke axial engine of claim 11, further comprising a secondary roller with a taper profile.

13. The opposed piston two stroke axial engine of claim 9, further comprising a plurality of cylinders separated into groups wherein the plurality of cylinders are equipped with deactivation hardware so as not to deactivate a same pair of Previously Presented all the time and therefore spread wear to the plurality of cylinders evenly.

14. The opposed piston two stroke axial engine of claim 13, wherein the deactivation hardware is comprised of valves that block intake ports and exhaust ports.

15. An opposed piston two stroke axial engine wherein a piston assembly engages a cam with a plurality of primary rollers in order to spread contact loads and reduce roller to cam slippage, a plurality of provisions to react out piston side loads with a plurality of roller element bearings, the opposed piston two stroke axial engine having an oil supply system with a spring loaded oil delivery head on a piston skirt.

16. An opposed piston two stroke axial engine wherein a piston assembly engages a cam with a primary roller in order to spread contact loads and reduce roller to cam slippage, a plurality of provisions to react out piston side loads with a plurality of roller element bearings, wherein the opposed piston two stroke axial engine has an oil delivery system with an oil delivery slider that is spring loaded against a piston oil delivery groove by an oil delivery pipe, wherein the oil delivery slider is movable with respect to the oil delivery pipe.

* * * * *